United States Patent
Lepa et al.

(10) Patent No.: US 9,511,325 B2
(45) Date of Patent: Dec. 6, 2016

(54) METHOD FOR REGENERATING AQUEOUS DISPERSIONS AND CELL PACKAGE FOR ELECTRODIALYSIS

(71) Applicant: Henkel AG & Co. KGaA, Duesseldorf (DE)

(72) Inventors: Klaus Lepa, Troisdorf (DE); Ulrich Dawidowski, Wildberg (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 93 days.

(21) Appl. No.: 14/284,530

(22) Filed: May 22, 2014

(65) Prior Publication Data
US 2014/0251810 A1 Sep. 11, 2014

Related U.S. Application Data

(63) Continuation of application No. PCT/EP2012/073950, filed on Nov. 29, 2012.

(30) Foreign Application Priority Data

Nov. 29, 2011 (DE) .......................... 10 2011 087 314

(51) Int. Cl.
*B01D 61/44* (2006.01)
*B01D 57/02* (2006.01)
(Continued)

(52) U.S. Cl.
CPC ............... *B01D 57/02* (2013.01); *B01D 61/50* (2013.01); *B01D 63/085* (2013.01); *B01D 2313/143* (2013.01); *C02F 1/4693* (2013.01)

(58) Field of Classification Search
CPC ....... B01D 61/44; B01D 61/422; C02F 1/4693
See application file for complete search history.

(56) References Cited

U.S. PATENT DOCUMENTS

| 2,848,402 A | 8/1958 | De Haas Van Dorsser et al. |
| 4,600,493 A | 7/1986 | Korngold |

(Continued)

FOREIGN PATENT DOCUMENTS

| DE | 10241733 A1 | 3/2004 |
| WO | 94/29495 | 12/1994 |

(Continued)

OTHER PUBLICATIONS

International Search Report for PCT/EP2012/073950, 3 pages.

*Primary Examiner* — Arun S Phasge
(74) *Attorney, Agent, or Firm* — Mary K. Cameron

(57) ABSTRACT

The present invention relates to a method for reducing the ionic strength or the concentration of certain polyvalent ions in aqueous dispersions of organic binding agents or inorganic solid bodies by electrodialysis, and a cell package suitable for use in the method. This method permits stabilization of aqueous compositions of the dispersed components by regulating the ionic strength or the concentration of certain polyvalent ions thereby increasing the durability and throughput times of coating baths. More particularly, the method is used in removing polyvalent metal cations from anionically stabilized aqueous binding agent dispersions. A special application exists in removing from autophoretic baths, which contain anionically dispersed organic binding agents and possibly inorganic pigments for forming protective layers on metallic components, polyvalent cations of zinc, iron and aluminum, which accumulate in the bath when components with surfaces comprised at least partially from zinc, iron and/or aluminum, are processed.

20 Claims, 6 Drawing Sheets

(51) Int. Cl.
*B01D 61/50* (2006.01)
*B01D 63/08* (2006.01)
C02F 1/469 (2006.01)

(56) References Cited

U.S. PATENT DOCUMENTS

| | | | |
|---|---|---|---|
| 4,626,288 | A | 12/1986 | Trzasko et al. |
| 4,639,319 | A | 1/1987 | Schellenberg et al. |
| 4,752,373 | A * | 6/1988 | Korngold ............... B01D 61/44 204/638 |
| 4,804,451 | A | 2/1989 | Palmer |
| 7,138,444 | B2 | 11/2006 | McGee et al. |
| 2011/0240538 | A1 | 10/2011 | Masutani et al. |

FOREIGN PATENT DOCUMENTS

| | | |
|---|---|---|
| WO | 98/39498 | 9/1998 |
| WO | 02/18029 | 3/2002 |
| WO | 2010066785 | 6/2010 |

\* cited by examiner

METHOD FOR REGENERATING AQUEOUS DISPERSIONS AND CELL PACKAGE FOR ELECTRODIALYSIS

FIELD OF THE INVENTION

The present invention relates to a method of reducing the ionic strength or certain polyvalent ions in aqueous dispersions of organic binders or inorganic solids using electrodialysis as well as a cell pack which is suitable for the method according to the invention. The method according to the invention makes it possible to stabilize aqueous compositions of the dispersed components by regulating the ionic strength or the concentration of certain polyvalent ions and thus to increase service lives of e.g. coating baths significantly. In particular, the method is used in removing polyvalent metal cations from anionically stabilized aqueous binder dispersions. One particular application consists in removing polyvalent cations of zinc, iron and aluminum from autophoretic baths containing anionically dispersed organic binders and optionally inorganic pigments for forming protective coats on metallic components, which cations become concentrated in the bath as a result of pickling processes during the passage of large numbers of components, the surfaces of which are made at least partially from zinc, iron and/or aluminum.

BACKGROUND OF THE INVENTION

Aqueous compositions containing dispersed active components are employed in a large number of industrial processes for the surface treatment of components and semi-finished products, wherein the components and semi-finished products are usually contacted with the aqueous dispersion by spraying or dipping. The aqueous dispersions that are contacted with the components and semi-finished products for surface-finishing purposes can for the most part be applied multiple times before the dispersion becomes so depleted in active components that additional active components have to be added for the desired success of the treatment. The aqueous dispersions that are employed for surface treatment are therefore collected after contacting with the component or stored in dipping baths and optionally worked up and regenerated so that they can be applied again for surface treatment. This type of repeated or continuous application leads to contaminants that adhere to the components being taken up by the aqueous dispersions and concentrated over time. Particularly critical is the salination of the aqueous dispersions, i.e. the entrainment of salts, since this causes a significant reduction in the stability of the dispersed active components. With increasing ionic strength, dispersions tend to coagulate since the electrostatic repelling forces between similarly charged electrolytic double layers of the dispersed active components are significantly weakened, so that the thermodynamically favored coagulation is inhibited less strongly. The progressive coagulation of the dispersed active components creates technical problems, on the one hand because sedimented active components are no longer available for surface finishing and on the other hand because the result of the surface finishing often depends partly on the size distribution of the dispersed active components.

For instance, the activation of vehicle bodies prior to anti-corrosive phosphating can be achieved with aqueous colloidal compositions of sparingly soluble phosphates or titanium salts, which form crystallization nuclei on the metal surfaces for the subsequent phosphating. Activation baths of this type are described in EP 0977908 or in WO 94/029495. The ability to form crystallization nuclei is possessed by the active components only if they do not exceed a particular particle size. In automotive manufacturing, vehicle bodies are contacted with the activating solution in the phosphating line, usually by spraying or dipping, during which contaminants, in particular salts, are introduced into the activating solution by the vehicle body. The entrainment of certain unwanted polyvalent ions, e.g. from the metal body to be treated, into these activation baths for phosphating can lead to more rapid consumption of the activating solution as a result of the associated acceleration of coagulation, and so this solution has to be either disposed of prematurely or regenerated by adding concentrates. This type of specific salination or entrainment of unwanted ions can therefore only be tolerated within a specific concentration range.

To a particular degree, the stability of organic binder dispersions is also influenced by the introduction of polyvalent ions. For example, aluminum salts are often employed as auxiliary substances for separating off coating components in the wet scrubbing of paint spray booths in the automotive industry. In many applications, however, the emphasis is on maintaining the stability of aqueous binder dispersions. For instance, after the anti-corrosive phosphating, vehicle bodies are generally provided with a dip coating. The dip coating is a water-based dispersion of one or more organic binders, which are deposited on the body upon immersion in the dip coating either electrolessly or with the application of an external voltage. The deposition mechanism of the binder in the dip coating is based on the fact that the surface charge of the dispersed binders in the immediate vicinity of the surface of the vehicle body is removed, so that coagulation and deposition of binder particles take place. Dip coatings therefore tend to coagulate as a result of their application if the concentration of a particular ionic species is exceeded. Conversely, this means that the entrainment or concentrating of certain ions can markedly reduce the stability of the dip coating. Typically, anodic or autophoretic dip coatings substantially consist of anionically stabilized binder components which can coagulate rapidly in the presence of polyvalent cations.

A need therefore exists to regulate the ionic strength or concentration of certain polyvalent ions in aqueous dispersions of inorganic solids and/or organic binders in order to maintain the stability of the dispersions over a prolonged period. To this end, it is necessary to establish a method that brings about a selective depletion of polyvalent cations in aqueous dispersions, but without significantly reducing the proportion of dispersed active components.

Various established separating methods exist for this purpose in the prior art, in which a selective mass transfer takes place through membranes. It is certainly generally known to the person skilled in the art that he can utilize filtration with exclusion limits lying just below the average particle size of the dispersed active components in order to separate the active components from the aqueous phase. However, so-called "cake-forming" filtration methods are not suitable for obtaining a filtrate containing the excess or unwanted polyvalent ions, since the filter cake consisting of the retained active components can only be redispersed with great effort. Membrane filtration methods that are operated as cross-flow filtration are suitable in principle for obtaining a filtrate, wherein unwanted ions can also be selectively removed from the retentate using ion-exchanging membranes. However, the aqueous dispersion is subjected to high shear stresses in so-called cross-flow filtrations, leading to coagulation of the dispersed constituents in the filter unit and in the pumps. This phenomenon often occurs in dispersions of organic binders, so the cross-flow filtration of e.g. dip coatings cannot be used for reducing ionic strength. Common to the filtration methods is the fact that the excess or unwanted polyvalent ions must first be removed from the filtrate, e.g. by precipitation, before the filtrate can be fed back to the dispersion, resulting in an overall reduction of the ionic strength or of the concentration of certain polyvalent ions in the dispersion. The use of filtration methods for reducing ionic strength is therefore extremely complex from a process engineering point of view, even in cases in which sufficiently high stability of the dispersion towards shear stress exists.

A method of reducing ionic strength in resin dispersions, which is suitable for the autodeposition of organic coatings on metallic surfaces, preferably iron surfaces, without external current can be taken from DE 3431276. The reducing of ionic strength, in particular of the concentration of iron ions, is carried out here too in order to stabilize the binder system in an autophoretic bath against coagulation. DE 3431276 gets around the problem of high shear stresses leading to coagulation of the paint constituents by recirculating the filtrate, i.e. the aqueous phase that is to be enriched with the unwanted ions, while the dispersion itself does not flow over ion-exchanging membranes in the filter module and is only in contact with these. This method makes possible a controlled reduction of the ion load in the aqueous dispersion of the binder, but the filter module must be regularly backwashed to remove binder particles from the membrane surfaces in order to guarantee consistent separating performance.

WO 02/18029 discloses a method for the selective separation of polyvalent cations from an autophoretic bath containing an organic binder dispersed in water, which tends to coagulate rapidly in the presence of polyvalent cations of the elements iron and zinc. According to this method, an acidic selective cation exchanger is supplied with the bath that is enriched with polyvalent cations and thus a reduction of the ions is achieved. The cation exchanger has to be regenerated at regular intervals.

SUMMARY OF THE INVENTION

Figure 1:
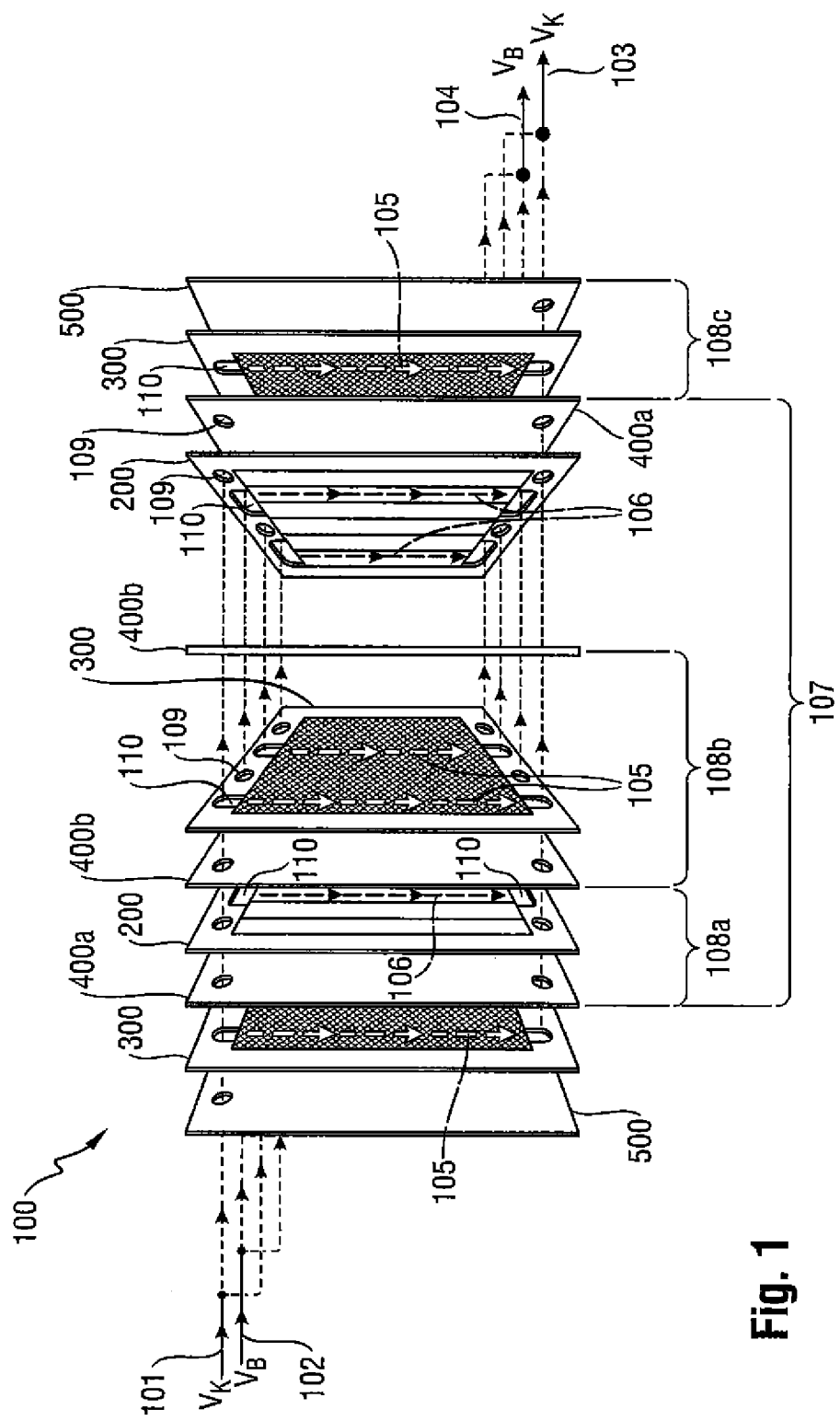
FIG. 1 shows a schematic layout of a cell pack according to the invention in an exploded perspective view.

Referring to the Figures by way of non-limiting example, in one embodiment the invention comprises a cell pack (100) for electrodialysis comprising a membrane stack consisting of a number n of membranes (400a, 400b) and n+1 membrane spacers (200, 300) of planar configuration, which each comprise a frame (203, 303) delimiting an internal space (204, 304) that is permeable to fluid orthogonally to the direction of the stack, wherein the n+1 membrane spacers (200, 300) and the n membranes (400a, 400b) are arranged alternately in the direction of the stack, wherein all of the membranes (400a, 400b) represent cation exchangers or all of the membranes (400a, 400b) represent anion exchangers and at least some of the membrane spacers (200, 300) that are not external spacers of the stack are selected from membrane spacers for laminar flow (200), which are configured in such a way that they have in their fluid-permeable internal space (204) a plurality of linear contact regions (202) with each of the respective directly adjacent membranes, which contact regions are spaced apart from one another, wherein the linear contact regions (202) formed with at least one of the directly adjacent membranes run in the same orientation as one another and do not cross one another and the average distance of these linear contact regions from one another is no smaller than the spacing of the membranes that are separated from one another by these membrane spacers (200) in the direction of their surface normals.

An embodiment of the aforedescribed cell pack (100) may comprise a membrane stack consisting of an even number n of membranes (400a, 400b), wherein at least each of the membrane spacers (200, 300) of the cell pack (100) which is a second membrane spacer in the direction of the stack, preferably only each of the membrane spacers (200, 300) of the cell pack (100) which is a second membrane spacer in the direction of the stack, is a membrane spacer for laminar flow (200).

An embodiment of the aforedescribed cell pack (100) may be characterized in that the membrane spacers for laminar flow (200) each have in the internal space (204) no further contact regions of any other type with one or both of the respective directly adjacent membranes, the average distance of which from one another is smaller than twice the distance of the directly adjacent membranes from one another, and preferably in each case no further contact regions of any other type with the respective directly adjacent membranes. An embodiment of the aforedescribed cell pack (100) may be characterized in that the contact regions (202) of the membrane spacers for laminar flow (200) in the internal space (204) are linear and preferably have a length of at least 50% and particularly preferably of at least 80% of the extent of the internal space (204) in the direction of the linear contact region (202). The membrane spacers for laminar flow (200) may space the directly adjacent membranes apart by at least $10^{-3}$ m in the direction of the stack.

An embodiment of the aforedescribed cell pack (100) may be characterized in that the membrane spacers for laminar flow (200) have in the internal space (204) a plurality of spacer elements (201) arranged at a distance from one another, wherein at least one fixing element (203) is provided, which joins a spacer element (201) to a directly adjacent spacer element (201) in each case to ensure that the spacer elements (201) are in a fixed position in relation to one another and wherein each spacer element (201) has a membrane contact region for linear contact either with one directly adjacent membrane or two opposing membrane contact regions (202) for linear contact with both of the directly adjacent membranes, wherein all membrane contact regions (202) of all spacer elements (201) for linear contact with only one of the directly adjacent membranes run orthogonally to the direction of the stack and in the same orientation as one another. In some embodiments, the at least one fixing element (203) is joined to the spacer elements (201) in such a way that the at least one fixing element (203)

of the spacer (200) has in the internal space (204) no membrane contact regions for linear contact with at least one of the directly adjacent membranes that cross a contact region (202) with one or more of the spacer elements (201) and that the at least one fixing element (203) of the membrane spacer (200) preferably has no membrane contact region in the internal space (204) for linear contact with at least one of the directly adjacent membranes.

An embodiment of the aforedescribed cell pack (100) may be characterized in that each membrane spacer for laminar flow (200) is delimited on the one side, in the same way in the direction of the stack, by a membrane which is selectively permeable to polyvalent ions and is delimited on the other side, in the same way in the direction of the stack, by a membrane which is selectively permeable to monovalent ions.

An embodiment of the afore-described cell pack (100) may be characterized in that each membrane spacer (300) that is not a membrane spacer for laminar flow is configured in the internal space (304) as a nonwoven, woven (301) or knitted fabric.

Another aspect of the invention provides a method of reducing the concentration of unwanted polyvalent ions in an aqueous bath containing a dispersed organic binder and polyvalent ions, in which a volume stream $V_B$ (102) of the bath liquid from the aqueous bath containing the bath liquid and a volume stream $V_K$ (101) of an aqueous concentrate from a concentrate reservoir storing the concentrate are fed into a cell pack (100) for electrodialysis comprising a membrane stack of a plurality of membranes (400a, 400b) spaced apart from one another which, in the event that unwanted polyvalent cations are contained in the bath liquid, comprises exclusively cation exchangers, and in the event that unwanted polyvalent anions are contained in the bath liquid, comprises exclusively anion exchangers, and electrically conductive current collectors (500) which delimit the membrane stack on both sides in the direction of the stack, in which the volume streams $V_B$ (102) and $V_K$ (101) break down within the cell pack (100) into partial volume streams $\delta_i(V_B)$ (106) and $\delta_i(V_K)$ (105), which flow separated spatially from one another, orthogonal to the surface normal of a series (107) of membranes (400a, 400b) of the membrane stack through the segments (108a, 108b) formed by directly adjacent and spaced apart membranes of the series (107) of membranes (400a, 400b), wherein segments (108a) of the series (107) of membranes (400a, 400b), through which only a partial volume stream $\delta_i(V_B)$ (106) of the bath liquid flows, alternate in the direction of the stack with those segments (108b) of the series (107) of membranes (400a, 400b) through which only a partial volume stream $\delta_i(V_K)$ (105) of the concentrate flows, wherein the bath liquid flows over adjacent membranes in a laminar fashion within the segments (108a) of the series (107) of membranes (400a, 400b), in which each of the outer membranes of the membrane stack (400a) on the side facing the directly adjacent current collector (500) is either in contact with an aqueous electrolyte which is spatially separated from the aqueous concentrate and the bath liquid by the segment (108c) formed by the respective current collector (500) and the respective outer membrane, or is likewise supplied with a flow of a partial volume stream $\delta_i(V_K)$ (105) of the aqueous concentrate, in which, at intervals or permanently, an electrical voltage is applied to the electrically conductive current collectors (500) which are in contact with the aqueous electrolyte and/or the aqueous concentrate, wherein the electrical voltage is sufficiently high to cause the electrolytic decomposition of the aqueous electrolyte and/or of the concentrate, and in which the partial volume streams $\delta_i(V_B)$ (106) of the bath liquid, after passing through the membrane stack, are combined and fed back into the aqueous bath, while the partial volume streams $\beta_i(V_K)$ (105) of the aqueous concentrate, after passing through the membrane stack, are combined and at least partially transferred into the concentrate reservoir.

In some embodiments, the ratio of average flow rate of the bath liquid in meters per second within the segments (108a) of the cell pack (100) through which the bath liquid with the partial volume streams $\beta_i(V_B)$ (106) flows, to the spacing between the membranes in the direction normal to their surfaces within these segments (106) in meters is less than 100, preferably less than 20, wherein the average flow rate of the bath liquid is preferably no greater than 0.1 m/s.

An embodiment of the aforedescribed method may fulfill the following condition within the segments (108a, 108b) of the cell pack formed by the series (107) of the membranes (400a, 400b):

$$\frac{d_B^2 \cdot x(V_B) \cdot \delta_i(V_K)}{d_K^2 \cdot x(V_K) \cdot \delta_i(V_B)}$$

is greater than 3, preferably greater than 4,
wherein
$\beta_i(V_B)$ denotes the partial volume stream of the bath liquid (106) within the segment (108) (m³/s)
$\beta_i(V_K)$ denotes the partial volume stream of the concentrate (105) within the segment (108) (m³/s)
$d_B$, $d_K$ denote the spacing between the membranes in the respective segment (108a, 108b) in the direction normal to their surfaces (m) and
$x(V_K; V_B)$ denotes the segment volume factor which expresses the proportion of free volume within the segment (108a, 108b) through which flow is passing in each case and $0 < x(V_K; V_B) \leq 1$.

An embodiment of the aforedescribed method may be characterized in that the electrical voltage is applied by potentiostatic pulses, the pulse duration preferably being in the range of 0.5 to 50 seconds, preferably in the range of 0.8 to 2 seconds, and the pulse rest phase preferably being in the range of 0.2 to 10 seconds, particularly preferably in the range of 0.4 to 1 second.

An embodiment of the aforedescribed method may be characterized in that, from an electrolyte reservoir storing the aqueous electrolyte, a volume flow $V_E$ of the aqueous electrolyte is fed into the cell pack (100) and breaks down within the cell pack into partial volume streams $\beta_i(V_E)$ that flow orthogonal to the surface normal of the outer membranes of the membrane stack through the segments (108c) of the cell pack (100) formed by the current collectors (500) and the directly adjacent outer membranes and, after passing through the segments (108c) within the cell pack (100), are combined and at least partially transferred into the electrolyte reservoir.

An embodiment of the aforedescribed method may be characterized in that exclusively the volume streams $V_B$ and $V_K$ are fed into the cell pack (100), wherein in each case a partial volume stream $\beta_i(V_K)$ (105) of the aqueous concentrate flows through the segments (108c) of the cell pack (100) formed by the current collectors (500) and the directly adjacent outer membranes, which is combined with the other partial volume streams $\beta_i(V_K)$ (105) of the aqueous concentrates that flow through the segments (108b) of the series (107) of membranes (400a, 400b) after passing through the segments (108c) within the cell pack (100). A cell pack (100)

as described above may be used and the partial volume streams $\delta_i(V_B)$ (106) of the bath liquid flow exclusively through those segments (108b) of the series (107) of membranes (400a, 400b) of which the directly adjacent membranes (400a, 400b) are spaced apart by membrane spacers for laminar flow (200).

An embodiment of the aforedescribed method may be characterized in that the concentration of an unwanted polyvalent ionic species in the concentrate lies below or is kept below a critical concentration by continuously or discontinuously replacing partial volumes of the aqueous concentrate with an aqueous solution having an electrical conductivity of at least 1 mScm$^{-1}$ containing no polyvalent ions, wherein for the critical concentration of an unwanted polyvalent ionic species the following relationship applies:

$$c_s^{krit}(K) = c_s(B) \cdot \frac{\sum_{i \neq s} z_i u_i c_i(K)}{\sum_{j \neq s} z_j u_j c_j(B)}$$

$c_s^{krit}(K)$ critical concentration of the unwanted polyvalent ionic species in the concentrate (mol/l)

$c_s(B)$: concentration of the unwanted polyvalent ionic species in the bath liquid (mol/l)

$z_i u_i c_i(K)$: products of charge number, ion mobility and concentration of an ionic species i with the same charge as the unwanted ionic species in the concentrate $z_j u_j c_j(B)$: products of charge number, ion mobility and concentration of an ionic species j with the same charge as the unwanted ionic species in the bath liquid $z_i$, $z_j$: charge number of the ionic species i, j $u_i$, $u_j$: ion mobility of the ionic species i, j (m$^2$s$^{-1}$V$^{-1}$)

$c_i$, $c_j$: concentration of the ionic species i, j (mol/l)

An embodiment of the aforedescribed method may be characterized in that the bath liquid contains an anionically dispersed binder and unwanted polyvalent cations, the unwanted polyvalent cations being selected from zinc ions, iron ions and/or aluminum ions.

An embodiment of the aforedescribed method may be characterized in that free fluoride ions are additionally contained in the bath liquid.

An embodiment of the aforedescribed method may be characterized in that the membranes (400a, 400b) of the series (107) of membranes (400a, 400b) which, on the side facing the cathode, are supplied with flow of the aqueous concentrate or are in contact with the aqueous electrolyte, are selectively permeable to unwanted polyvalent cations, while the membranes (400a, 400b) of the series (107) of membranes (400a, 400b) which, on the side facing the anode, are supplied with flow of the aqueous concentrate or are in contact with the aqueous electrolyte, are selectively permeable to monovalent cations.

DETAILED DESCRIPTION OF THE INVENTION

An object of the present invention includes providing an alternative method of reducing the ionic strength or the concentration of polyvalent ions in an aqueous dispersion of an organic binder and/or inorganic solid, in which the concentration of certain polyvalent cations or anions in the aqueous dispersion can be effectively reduced without dispersed active components being removed irreversibly, as it were. The method should be suitable for use in the continuous operation of a method of surface treatment wherein the reduction of the ionic strength or of the concentration of certain polyvalent ions should be carried out with the minimum of maintenance. The method should in particular be suitable for the effective regulation of the concentration of polyvalent ions that potentially cause the coagulation of the binder, in particular iron ions, zinc ions and aluminum ions, in acidic aqueous deposition baths containing dispersed organic binders, which are set up to operate by autophoresis.

This object is achieved by an electrodialysis method in which a volume stream $V_B$ of a bath liquid containing a dispersed organic binder and/or a dispersed inorganic solid as well as polyvalent cations and/or polyvalent anions from an aqueous bath containing the bath liquid and a volume stream $V_K$ of an aqueous concentrate from a concentrate reservoir storing the concentrate are fed into a cell pack for electrodialysis comprising a membrane stack of a plurality of membranes spaced apart from one another which, in the event that unwanted polyvalent cations are contained in the bath liquid, comprises exclusively cation exchangers, and in the event that unwanted polyvalent anions are contained in the bath liquid, comprises exclusively anion exchangers, and electrically conductive current collectors which delimit the membrane stack on both sides in the direction of the stack, in which the volume streams $V_B$ and $V_K$ break down within the cell pack into partial volume streams $\delta_i(V_B)$ and $\delta_i(V_K)$, which flow separated spatially from one another, orthogonal to the surface normal of a series of membranes of the membrane stack, through the segments formed by directly adjacent and spaced apart membranes of this series, wherein segments of the series of membranes through which only a partial volume stream $\delta_i(V_B)$ of the bath liquid flows alternate in the direction of the stack with those segments of the series of membranes through which only a partial volume stream $\delta_i(V_K)$ of the concentrate flows, wherein the bath liquid flows over adjacent membranes in a laminar fashion within the segments of the series of membranes, in which each of the outer membranes of the membrane stack on the side facing the directly adjacent current collector is either in contact with an aqueous electrolyte which is spatially separated from the aqueous concentrate and the bath liquid by the segment formed by the respective current collector and the respective outer membrane, or is likewise supplied with a flow of a partial volume stream $\delta_i(V_K)$ of the aqueous concentrate, in which, at intervals or permanently, an electrical voltage is applied to the electrically conductive current collectors which are in contact with the aqueous electrolyte and/or the aqueous concentrate, wherein the electrical voltage is sufficiently high to cause the electrolytic decomposition of the aqueous electrolyte and/or the concentrate, and in which the partial volume streams $\beta_i(V_B)$ of the bath liquid, after passing through the membrane stack, are combined and fed back into the aqueous bath, while the partial volume streams $\delta_i(V_K)$ of the aqueous concentrate, after passing through the membrane stack, are combined and at least partially transferred into the concentrate reservoir.

Within the meaning of the present invention, those polyvalent ions are unwanted which reduce the quality of the bath in relation to its particular intended application when a threshold concentration is exceeded in the bath liquid. Accordingly, unwanted polyvalent ions are always ions that have a coagulating effect in bath liquids containing organic binders and/or inorganic solids.

Cation exchangers or anion exchangers are considered according to the invention to be polymeric materials with ionogenic functional groups and freely moving counterions, in which the ratio of cations to anions or of anions to cations in the ion exchanger is greater than 1, based in each case on the freely moving counterions. The method according to the invention, because of the exclusive use of selectively ion-exchanging membranes of the same type, each of which has a flow of the bath liquid on one side and of the aqueous concentrate on the other side, enables a migration of the unwanted polyvalent cations or anions to take place out of the bath liquid into the aqueous concentrate, with an enrichment of the unwanted polyvalent ions in the concentrate being achieved. Likewise, an enrichment of unwanted polyvalent cations is achieved directly in the aqueous electrolyte which is in contact with the current collector that is connected as the cathode, while unwanted polyvalent anions are enriched directly in the electrolyte which is in contact with the current collector that is connected as the anode. At the same time, through the exclusive use of selective ion-exchanging membranes of the same type, coagulation of the dispersed constituents on the membrane surfaces due to their surface charge, which is usually opposite to that of the unwanted polyvalent ions, is avoided.

At the same time, a very moderate shear stress is present within the cell pack in the method according to the invention because of the laminar flow of the bath liquid over the ion exchange membranes. A coagulation of the dispersed solid portions induced by shear stress of the bath liquid is likewise avoided in this way, so that no coagulate passes into the bath and the cell pack does not become blocked in the segments in which the bath liquid flows.

The laminar flow of the bath liquid over the membranes is characterized according to the invention in that the bath liquid follows the contour of the membrane outside a laminar boundary layer and the flow does not separate or become turbulent.

For this purpose, at least one of the following two conditions is fulfilled in a preferred method according to the invention:

i) The dimensionless Reynolds number, defined as the product of average flow rate in the segments of the membrane stack through which the bath liquid flows and the spacing between the membranes within the same segments through which a partial volume stream $\delta_i(V_B)$ flows, divided by the kinematic viscosity of the bath liquid, is less than 2000, particularly preferably less than 1000, in particular less than 100. The Reynolds number is calculated as follows:

$$Re = v \cdot \frac{d}{v}$$

Re: Reynolds number
v: average flow rate in the segments of the membrane stack through which the bath liquid flows (m/s)
d: spacing between the membranes in the direction normal to their surfaces within the segments through which the bath liquid flows (m)
v: kinematic viscosity of the bath liquid at the respective temperature of the bath liquid ($m^2 s^{-1}$)

ii) The ratio of average flow rate of the bath liquid in meters per second within the segments of the cell pack through which the bath liquid with the partial volume streams $\delta_i(V_B)$ flows to the spacing between the membranes in the direction normal to their surfaces within these segments in meters is less than 100, preferably less than 20.

The average flow rate is preferably calculated theoretically from the respective partial volume stream $\delta_i(V_B)$, the maximum width of the internal space of the respective segment delimited by the membrane spacer orthogonal to the direction of flow and a volume factor as follows:

$$v = \frac{\delta_i(V_B)}{d \cdot I \cdot x(V_B)}$$

V: average flow rate of the bath liquid (m/s)
$\beta_i(V_B)$: partial volume stream of the bath liquid within the segment ($m^3/s$)
d: spacing between the membranes in the segment in the direction normal to their surfaces (m)
I: maximum width of the internal space of the respective segment delimited by the membrane spacer orthogonal to the direction of flow and orthogonal to the surface normal of the membranes that are spaced apart by the segment (m)
$x(V_B)$: segment volume factor, which expresses the proportion of free fluid-permeable volume within the segment through which the respective partial volume stream $\delta_i(V_B)$ flows and $0<x(V_B)\leq 1$ The segments of the cell pack are the volumes of space ("segment volumes") delimited by directly adjacent membranes and the membrane spacer within which the partial volume streams $\delta_i(V_B)$ or $\delta_i(V_K)$ flow separately from one another, The bath liquid in the method according to the invention at 20° C. preferably has a dynamic viscosity at the respective temperature of the bath liquid of at least 0.8 mPas and no more than 20 mPas, while the flow of the bath liquid orthogonal to the surface normal of the membranes of the cell pack takes place with an average flow rate of preferably no more than 0.1 m/s, particularly preferably no more than 0.01 m/s.

In a preferred method, the following condition is additionally fulfilled within the segments of the cell pack formed by the series of membranes:

$$\frac{d_B^2 \cdot x(V_B) \cdot \delta_i(V_K)}{d_K^2 \cdot x(V_K) \cdot \delta_i(V_B)}$$

is greater than 3, preferably greater than 4, wherein
$\beta_i(V_B)$ denotes the partial volume stream of the bath liquid within the segment ($m^3/s$)
$\delta_i(V_K)$ denotes the partial volume stream of the concentrate within the segment ($m^3/s$)
$d_B$, $d_K$ denote the spacing between the membranes in the respective segment in the direction normal to their surfaces (m) and
$x(V_K; V_B)$ denotes the segment volume factor which expresses the fraction of free fluid-permeable volume within the segment through which flow is passing in each case
($0<x(V_K; V_B)\leq 1$).

If this condition is additionally fulfilled, a substantially stronger flow results in the segments of the membrane stack through which concentrate flows compared with the laminar flow in the segments through which the bath liquid flows. Because of the thus increased convection in the segments through which the concentrate flows, rapid mixing of the segment volume is achieved and the mass transfer increases in the direction of the stack of membranes.

In a preferred method according to the invention, the voltage that is applied to the current collector of the cell pack has the effect that a current density of at least 0.1 mAcm$^{-2}$, preferably at least 1 mAcm$^{-2}$, but preferably no more than 10 mAcm$^{-2}$ results.

Furthermore, it is preferred that a rectified electrical voltage is applied to the current collectors and no pole reversal takes place during the method, with the electrical voltage particularly preferably being applied by potentiostatic pulses, in which case the pulse duration, i.e. the duration of a single pulse, is preferably in the range of 0.5 to 50 seconds, particularly preferably in the range of 0.8 to 2 seconds, and the pulse rest phase, i.e. the phase between two pulses during which no voltage is applied to the current collectors, is preferably in the range of 0.2 to 10 seconds, particularly preferably in the range of 0.4 seconds to 1 second. The application of a rectified voltage at intervals brings the advantage that the solid portions dispersed in the bath liquid, which accumulate on membranes over which the bath liquid flows owing to their migration in the electrical field, can be transported away in the flow field upon discontinuation of the electrical voltage, so that a possible coagulation of the dispersed solids and an associated blockage of the membrane is prevented.

In a preferred method according to the invention, the current collectors have a planar configuration and are in contact with the electrolyte exclusively on their inner surfaces which face the membrane stack, and the current collectors are particularly preferably configured with the same dimensions as the membranes of the stack of the cell pack.

The membranes preferably take the form of rectangular surfaces in the method according to the invention, with the sides of the rectangular surfaces being preferably at least 0.05 m long but preferably no longer than 1.0 m.

The current collectors can be made of, inter alia, corrosion-resistant alloys, such as nickel-molybdenum alloys (Hastelloy®), or represent platinum- or graphite-laminated metallic or metallically conductive support materials. In addition to the corrosion resistance and abrasion resistance of the electrode material, an economically viable process requires that the electrode materials for the corresponding electrochemical partial reaction for decomposing the electrolyte exhibit the lowest possible overvoltage, so the current collectors are often coated with precious metals of the elements platinum, ruthenium and/or iridium in the region of contact with the aqueous electrolyte and/or the aqueous concentrate.

In a preferred embodiment of the method according to the invention, a volume stream $V_E$ of the aqueous electrolyte is fed from an electrolyte reservoir storing the aqueous electrolyte into the cell pack, which volume stream breaks down within the cell pack into partial volume streams $\delta_i(V_E)$, which flow orthogonally to the surface normal of the outer membranes of the membrane stack through the segments of the cell pack formed by the current collectors and the directly adjacent outer membranes, wherein, after flowing through the segments, the partial volume streams $\delta_i(V_E)$ are preferably combined within the cell pack and preferably transferred at least partially into the concentrate reservoir. In this preferred embodiment, therefore, a total of three separate volume streams $V_B$, $V_K$ and $V_E$ are fed independently of one another into the cell pack and break down there into partial volume streams, each running orthogonally to the direction of the stack. This embodiment enables the electrolytic process to be optimized on the basis of the separate volume streams of concentrate and electrolyte independently of the concentrate, so that e.g. low decomposition voltages can be achieved. Furthermore, it is advantageous that the electrolyte can be exchanged or regenerated independently of the concentrate.

In addition, in a method according to the invention for reducing unwanted polyvalent ions in a bath liquid, it is preferred to feed volume streams $V_E$ of an aqueous electrolyte into the cell pack into each of the anolyte and the catholyte separately from one another, so that in this way the anolyte and catholyte can be exchanged or regenerated independently of one another. This brings the advantage that, because of the separation of the material cycles of catholyte and anolyte, no steady state is reached in relation to the concentration of unwanted polyvalent ions within the segments of the membrane stack, since either the catholyte with the use of cation exchangers according to the invention or the anolyte with the use of anion exchangers represents a sink for the polyvalent cations or anions respectively, so that the concentration of the respective unwanted polyvalent cations or anions in the catholyte or anolyte respectively increases constantly, while in all the other segments of the membrane stack it decreases constantly.

In an alternative embodiment of the method according to the invention, which is less complex from a process engineering perspective, no aqueous electrolyte is additionally fed into the cell pack and the membrane stack consists exclusively of membranes of the series of membranes within which each membrane is supplied on one side with a laminar flow of the bath liquid, and segments through which the bath liquid flows alternate with segments through which the aqueous concentrate flows. In this embodiment, therefore, exclusively the volume streams $V_B$ and $V_K$ are fed into the cell pack.

The method according to the invention for this preferred case is therefore reduced to an electrodialysis method for reducing unwanted polyvalent ions in an aqueous bath, in which a volume stream $V_B$ of the bath liquid containing a dispersed organic binder and/or a dispersed inorganic solid as well as polyvalent cations and/or polyvalent anions from the bath containing the bath liquid and a volume stream $V_K$ of an aqueous concentrate from a concentrate reservoir storing the concentrate are fed into a cell pack for electrodialysis comprising a membrane stack which, in the event that unwanted polyvalent cations are contained in the bath liquid, comprises exclusively cation exchangers, and in the event that unwanted polyvalent anions are contained in the bath liquid, comprises exclusively anion exchangers, and electrically conductive current collectors which delimit the membrane stack on both sides in the direction of the stack, in which the volume streams $V_B$ and $V_K$ break down within the cell pack into partial volume streams $\beta_i(V_B)$ and $\beta_i(V_K)$, which flow separated spatially from one another, orthogonal to the surface normal of the membranes of the membrane stack through the segments formed by directly adjacent and spaced apart membranes of this series, wherein segments through which only a partial volume stream $\delta_i(V_B)$ of the bath liquid flows alternate in the direction of the stack with those segments through which only a partial volume stream $\delta_i(V_K)$ of the concentrate flows, wherein the bath liquid flows in a laminar fashion over adjacent membranes within the segments, in which each of the outer membranes of the membrane stack on the side facing the directly adjacent current collector is supplied with a flow of a partial volume stream $\delta_i(V_K)$ of the aqueous concentrate, in which, at intervals or permanently, an electrical voltage is applied to the electrically conductive current collectors which are in contact with the aqueous concentrate, wherein the electrical voltage is sufficiently high to cause the electrolytic decomposition of the aqueous concentrate, and in which the partial volume streams $\delta_i(V_B)$ of the bath liquid, after passing through the membrane stack, are combined and fed back into the aqueous bath, while the partial volume streams $\delta_i(V_K)$ of the aqueous concentrate, after passing through the membrane stack, are combined and at least partially transferred into the concentrate reservoir.

In this process, the concentration takes place in the segments of the membrane stack through which the concentrate flows and the depletion takes place in the segments of the membrane stack through which the bath liquid flows until a steady state is reached in relation to one or more cationic or anionic species. This comparatively moderate concentration, which, however, affects all segments of the membrane stack through which concentrate flows, is associated with the specific advantage that, in a method according to the invention for reducing polyvalent cations in a bath liquid, a precipitation of sparingly soluble hydroxides in the catholyte can be largely prevented because of the nature of the method.

The partial volume streams $\delta_i(V_B)$, $\delta_i(V_K)$ and $\delta_i(V_E)$, which run orthogonally to the direction of the stack of membranes and which flow through individual segments of the cell pack that are spanned by the membrane stack, are in the same orientation in a preferred embodiment of the method according to the invention, i.e. they flow through the segments of the membrane stack in a common direction.

The aqueous electrolyte and the aqueous concentrate in the method according to the invention preferably have a specific electrical conductivity of at least 1 mScm$^{-1}$ and particularly preferably of at least 10 mScm$^{-1}$.

The concentration of an unwanted polyvalent ionic species in the concentrate of a method according to the invention is preferably below a critical concentration. The critical concentration of an unwanted polyvalent ionic species in the aqueous concentrate is the concentration of the same unwanted polyvalent ionic species in the bath liquid multiplied by the ratio of the sum of the product of charge number, concentration and ion mobility of all of the other ionic species having the same charge as the unwanted ionic species in the concentrate to the sum of the product of charge number, concentration and ion mobility of all of the other ionic species having the same charge as the unwanted ionic species in the bath liquid. For the critical concentration of unwanted polyvalent ions, therefore, the following relationship applies:

$$c_s^{krit}(K) = c_s(B) \cdot \frac{\sum_{i \neq s} z_i u_i c_i(K)}{\sum_{j \neq s} z_j u_j c_j(B)}$$

$c_s^{krit}(K)$ critical concentration of the unwanted polyvalent ionic species in the concentrate (mol/l)

$c_s(B)$: concentration of the unwanted polyvalent ionic species in the bath liquid (mol/l)

$z_i u_i c_i(K)$: products of charge number, ion mobility and concentration of an ionic species i with the same charge as the unwanted ionic species in the concentrate $z_j u_j c_j(B)$: products of charge number, ion mobility and concentration of an ionic species j with the same charge as the unwanted ionic species in the bath liquid $z_i$, $z_j$: charge number of the ionic species i, j $u_i$, $u_j$: ion mobility of the ionic species i, j (m$^2$s$^{-1}$V$^{-1}$)

$c_i$, $c_j$: concentration of the ionic species i, j (mol/l)

Above this critical concentration of an unwanted polyvalent ionic species in the concentrate, a reduction of the proportion of the same ions in the bath liquid is not effective in a method according to the invention. In a preferred method according to the invention and in particular in a method in which the electrolyte is identical with the concentrate, wherein the membrane stack exclusively contains membranes from the series of membranes and exclusively the volume streams $V_B$ and $V_K$ are fed into the cell pack, partial volumes of the concentrate are therefore replaced continuously or discontinuously with concentrate solution which contains no unwanted polyvalent ions and is preferably an aqueous solution having an electrical conductivity of at least 1 mScm$^{-1}$, or unwanted polyvalent ions are removed by precipitation and filtration of the concentrate to ensure that the proportions of the unwanted polyvalent ions in the concentrate do not lie above their respective critical concentration. The preferred procedure in this case is that the proportion of unwanted polyvalent ions in the concentrate is monitored analytically in order to replace the concentrate at least partially with fresh concentrate solution when it approaches the critical concentration or to add a reagent to precipitate the unwanted polyvalent ions, so that the concentration of the unwanted polyvalent ions in the concentrate does not exceed the respective critical concentration.

In the method according to the invention, it is preferred that the charge transport in the concentrate occurs predominantly by hydronium ions or hydroxide ions, since these ions have the highest ion mobility in aqueous solutions and therefore the critical concentration of the unwanted polyvalent ions in the concentrate assumes a comparatively high value, so that an effective reduction of the respective unwanted polyvalent ionic species in the bath liquid can take place.

To remove unwanted polyvalent cations from a bath liquid, the concentrate preferably possesses a pH value below 3, particularly preferably below 2, but to avoid the degradation of the cation exchangers the pH value is preferably not below 0.5. Furthermore, in a method of removing unwanted polyvalent cations from a bath liquid, a ratio of the pH values of bath liquid to aqueous concentrate of greater than 1 is preferred, and in particular the pH value of the concentrate is at least one unit lower than that in the bath liquid.

The pH value in the concentrate in a preferred method of reducing the concentration of unwanted polyvalent cations in a bath liquid is preferably adjusted with strong acids selected from sulfuric acid, hydrochloric acid, perchloric acid and nitric acid, and sulfuric acid is particularly preferably used to adjust the pH value. Similarly, in a method of reducing the concentration of unwanted polyvalent anions in a bath liquid, the concentrate preferably possesses a pH value greater than 11, particularly preferably greater than 12, but to avoid the degradation of the anion exchangers the pH value is preferably no greater than 13.5. Furthermore, by analogy, in a method of reducing unwanted polyvalent anions from a bath liquid, a ratio of the pH values of bath liquid to aqueous concentrate of less than 1 is preferred, and in particular the pH value of the concentrate is at least one unit greater than that in the bath liquid.

The pH value in the concentrate in a preferred method of reducing the concentration of unwanted polyvalent anions in a bath liquid is preferably adjusted with alkalis selected from sodium hydroxide, potassium hydroxide, magnesium hydroxide, calcium hydroxide and ammonia, and sodium hydroxide is particularly preferably used to adjust the pH value.

As a result of these measures relating to the acidity or alkalinity of the concentrate, a high concentration of the unwanted polyvalent ions in the concentrate is made possible.

The preferred embodiments of methods according to the invention mentioned above in relation to the composition of the concentrate, applied in a similar way to the composition of the electrolyte, likewise form preferred embodiments of the method according to the invention in relation to the electrolyte.

An improved concentration of the unwanted polyvalent ions in the concentrate can also be achieved by the fact that the membranes of the membrane stacks that are supplied with a flow of the bath liquid are selectively permeable to mono- and polyvalent ions alternately in the direction of the stack.

A preferred method according to the invention for reducing the concentration of unwanted polyvalent cations in the bath liquid is distinguished by the fact that the membranes of the series of membranes within which each membrane is supplied on one side by a laminar flow of the bath liquid and which, on the side facing the cathode, are supplied with a flow of the aqueous concentrate or are in contact with the aqueous electrolyte, are selectively permeable to polyvalent cations, preferably unwanted polyvalent cations, while the membranes of the series of membranes within which each membrane is supplied on one side by a laminar flow of the bath liquid and which, on the side facing the anode, are supplied with a flow of the aqueous concentrate or are in contact with the aqueous electrolyte, are selectively permeable to monovalent cations.

The analogous preferred method of reducing the concentration of unwanted polyvalent anions in the bath liquid is distinguished by the fact that the membranes of the series of membranes within which each membrane is supplied on one side by a laminar flow of the bath liquid and which, on the side facing the cathode, are supplied with a flow of the aqueous concentrate or are in contact with the aqueous electrolyte, are selectively permeable to monovalent anions, while the membranes of the series of membranes within which each membrane is supplied on one side by a laminar flow of the bath liquid and which, on the side facing the anode, are supplied with a flow of the aqueous concentrate or are in contact with the aqueous electrolyte, are selectively permeable to polyvalent anions, preferably unwanted polyvalent anions.

Selectively permeable ion exchange membranes are commercially available and are based on so-called chelate resins, which have a relatively high affinity with certain unwanted polyvalent ions or certain monovalent ions in the concentrate and electrolyte. In this preferred variant of the method according to the invention it is achieved that preferably polyvalent ions migrate into the concentrate or the electrolyte, while conversely migration out of the concentrate or electrolyte into the bath liquid is inhibited, so that overall an increased concentration of the polyvalent ions in the concentrate occurs.

The method according to the invention is particularly advantageous if the unwanted polyvalent ions in the bath liquid have an opposite charge to the surface charge of the dispersed constituents of the bath liquid. At the interface between the ion exchangers to be used according to the invention and the bath liquid, an electrical membrane potential ("Donnan potential") is then formed, which causes an electrostatic repulsion of the dispersed constituents, so that a blockage of the ion-exchanging membranes by migration or electrostatic attraction of the dispersed constituents is counteracted. This effect therefore always comes into play when the surface charge of the dispersed constituents is negative in the case of the use according to the invention of cation-exchanging membranes and positive in the case of the use according to the invention of anion-exchanging membranes.

Preferred methods according to the invention therefore relate on the one hand to the removal of unwanted polyvalent anions from bath liquids having a cationically dispersed solids content and on the other hand to the removal of unwanted polyvalent cations from bath liquids having an anionically dispersed solids content, wherein the solids content preferably comprises at least one dispersed organic binder and/or at least one dispersed inorganic solid.

In this context, therefore, in particular methods of removing unwanted polyvalent anions, e.g. phosphate ions, from dip coatings containing a cationically dispersed organic binder system, e.g. from cathodic dip coatings (CDC), and methods of removing unwanted polyvalent cations, e.g. zinc, aluminum and iron ions, from dip coatings containing an anionically dispersed organic binder system, e.g. from anodic dip coatings (ADC), are preferred.

In addition, it has been found that the method according to the invention using a cell pack consisting of exclusively cation exchangers is extremely suitable for regenerating autophoretic baths which represent acidic aqueous compositions containing an anionically dispersed organic binder together with iron(III) ions and preferably also free fluoride ions. Anionically dispersed organic binders possess a negative zeta potential, i.e. a negative surface charge. Typical autophoretic baths are described e.g. in the publications U.S. Pat. No. 7,138,444 B2 (claim 11; column 13, line 43 to column 14, line 28) and WO 2010/066785 (page 5, line 10 to page 6, line 7; page 19, lines 1-29), to which explicit reference is made here, wherein in particular the water-soluble constituents of the autophoretic compositions disclosed there and their relative proportions to one another are prototypical of the bath liquids to be worked up in the present invention.

In aqueous compositions that have a binder system adapted to the autophoretic coating of metal surfaces made of iron, zinc and aluminum, a marked enrichment with polyvalent cations of the metals iron, zinc and aluminum takes place in the technical application of the process because of the pickling of the metallic surfaces to be coated. This enrichment leads to a destabilizing of the binder system dispersed in the autophoretic bath, so that limit values for the concentration of these polyvalent cations in the bath liquid have to be maintained and these polyvalent cations are unwanted ions within the meaning of the present invention.

To reduce the proportion of polyvalent cations in these aqueous autophoretic baths, and in particular to reduce the proportion of iron ions, aluminum ions and zinc ions, a method according to the invention is particularly suitable in which a volume stream $V_B$ of the bath liquid from the aqueous bath containing the bath liquid and a volume stream $V_K$ of an aqueous concentrate, which preferably contains less than the critical concentration of iron ions, aluminum ions or zinc ions, from a concentrate reservoir storing the concentrate are fed into a cell pack for electrodialysis containing a membrane stack which comprises only cation exchangers and is delimited on both sides in the direction of the stack by two electrically conductive current collectors, in which the volume streams $V_B$ and $V_K$ break down within the cell pack into partial volume streams $\delta_i(V_B)$ and $\delta_i(V_K)$, which flow separated spatially from one another, orthogonal to the surface normal of a series of membranes of the membrane stack, through the segments formed by directly adjacent and spaced apart membranes of this series, wherein segments of the series of membranes through which only a partial volume stream $\delta_i(V_B)$ of the bath liquid flows alternate in the direction of the stack with those segments of the series of membranes through which only a partial volume stream $\delta_i(V_K)$ of the concentrate flows, wherein the bath liquid flows over adjacent membranes in a laminar fashion within the segments of the series of membranes, in which each of the outer membranes of the membrane stack on the side facing the directly adjacent current collector is either in contact with an aqueous electrolyte which is spatially separated from the aqueous concentrate and the bath liquid by the segment formed by the respective current collector and the respective outer membrane, or is likewise supplied with a flow of a partial volume stream $\delta_i(V_K)$ of the aqueous concentrate, in which, at intervals or permanently, an electrical voltage is applied to the electrically conductive current collectors which are in contact with the aqueous electrolyte and/or the aqueous concentrate, wherein the electrical voltage is sufficiently high to cause the electrolytic decomposition of the aqueous electrolyte and/or the concentrate, and in which the partial volume streams $\delta_i(V_B)$ of the bath liquid, after passing through the membrane stack, are combined and fed back into the aqueous bath, while the partial volume streams $\delta_i(V_K)$ of the aqueous concentrate, after passing through the membrane stack, are combined and at least partially transferred into the concentrate reservoir.

The preferred embodiments already mentioned for the method according to the invention of reducing the ionic strength or the concentration of certain polyvalent ions in an aqueous dispersion of organic binders and/or inorganic solids also apply directly, in so far as reducing the concentration of unwanted polyvalent cations in the bath liquid is concerned, to the above-mentioned preferred method of reducing the content of polyvalent cations in autophoretic baths.

Surprisingly, it was found that, even in autophoretic baths containing free fluoride ions, the proportion of iron and aluminum ions could be effectively reduced, although the said cations are present in the bath liquid in a substantial proportion as negatively charged fluoro complexes. In the method according to the invention, even those unwanted polyvalent ions that are in chemical equilibrium with complexes having an opposite charge can obviously also be removed from the bath liquid to a satisfactory extent.

In another aspect, the present invention also relates to a cell pack for electrodialysis, which is suitable for the method according to the invention of reducing the ionic strength or the concentration of polyvalent ions in an aqueous dispersion of an organic binder and/or inorganic solid.

A cell pack for electrodialysis of this type comprises a membrane stack consisting of a number n of membranes and n+1 membrane spacers of planar configuration, which each comprise a frame delimiting an internal space that is permeable to fluid orthogonally to the direction of the stack, wherein the n+1 membrane spacers and the n membranes are arranged alternately in the direction of the stack, wherein all of the membranes represent cation exchangers or all of the membranes represent anion exchangers and at least some of the membrane spacers that are not external spacers of the stack are selected from membrane spacers for laminar flow, which are configured in such a way that they have in their internal space a plurality of linear contact regions with each of the respective directly adjacent membranes, which contact regions are spaced apart from one another, wherein the linear contact regions formed with at least one of the directly adjacent membranes run in the same orientation as one another and do not intersect and the average distance of the linear contact regions from one another is no smaller than the spacing of the membranes that are separated from one another by these membrane spacers in the direction of their surface normals.

The internal space of the membrane spacers is fluid-permeable within the meaning of the present invention if a fluid can flow through the internal space of the spacer completely in at least one direction orthogonally to the direction of the stack of membranes.

A membrane spacer for laminar flow makes it possible according to the invention for a fluid with a dynamic viscosity of at least 0.8 mPas, when it flows through the membrane spacer with an average flow rate of no more than 0.1 m/s, substantially to follow the contour of the directly adjacent membrane that is spaced apart by the spacer outside a laminar boundary layer, with no separation or turbulence of the flow, so that a steady flow is formed within the membrane spacer.

Those membrane spacers that are not external spacers of the stack have according to the invention a plurality of linear contact regions with the respective directly adjacent membranes running in the same orientation in the internal space delimited by the frame if each of the linear contact regions with the respective membrane can hypothetically be aligned parallel to each individual one of the other contact regions by rotating it by no more than 45°, preferably by no more than 20°.

The cell pack for electrodialysis according to the invention is distinguished by the fact that it comprises membrane spacers for laminar flow which, owing to their linear contact regions with at least one of the membranes that are spaced apart and owing to the minimum spacing of these linear contact regions from one another that is provided, enable an oriented through-flow of a fluid to take place with an almost homogeneous flow field, so that a fluid with a dynamic viscosity of at least 0.8 mPas with an average flow rate of no more than 0.1 m/s neither becomes turbulent nor forms laminar boundary layers that extend far into the fluid-permeable internal space. The use of such a cell pack in a method according to the invention brings the advantage that the bath liquid, when it flows through the membrane spacers for laminar flow, is exposed to only low shear stress and the solid portions that are dispersed in the bath liquid are therefore not caused to coagulate.

In this context, a cell pack is preferred in which the membrane spacers for laminar flow space the directly adjacent membranes apart by at least $10^{-3}$ m in the direction of the stack, to allow only low shear forces within the segment with average flow rates of a fluid of no more than 0.1 m/s.

In a preferred embodiment of the cell pack, the membrane spacers for laminar flow are similarly aligned along the stack in the cell pack. Accordingly, it is preferred that the membrane spacers for laminar flow are similarly aligned in the cell pack in relation to their linear contact regions which run in the same orientation as one another and do not intersect in the respective internal space. The membrane spacers for laminar flow are in the preferred alignment if each of these linear contact regions in the internal space of such a spacer can hypothetically be aligned parallel to each individual linear contact region of the internal spaces of the other membrane spacers for laminar flow by rotating it by no more than 45°, preferably by no more than 20°.

The same alignment of the membrane spacers for laminar flow makes it possible for the partial volume streams $\delta_i(V_B)$ in the method according to the invention to be fed into the appropriate segment at similar points in the cell pack in each case and accordingly to flow out of the segment at similar points in the cell pack in each case.

Moreover, the membrane spacers for laminar flow are preferably stacked in the cell pack in such a way that their linear contact regions that they have in the internal space with at least one of the directly adjacent membranes, which contact regions run in the same orientation as one another and do not intersect, are always in contact with the directly adjacent membranes on the same side along the stack. As a result of this preferred arrangement of the membrane spacers in the cell pack in the method according to the invention, an optimum laminar flow can be achieved over that membrane within the segments through which the bath liquid flows, close to the surface of which an enrichment of the dispersed solids portions takes place because of the electrical field, so that coagulation can be effectively suppressed through the low shear stress in this region. For example, anionically dispersed binder constituents are enriched on the side of membranes facing the anode within the segments through which the bath liquid flows, so that an optimized flow just at these interfaces, which is brought about with the aid of the special configuration and alignment of the membrane spacers for laminar flow, can already suppress a coagulation of binder constituents in a method according to the invention.

Of course, it is preferred in general if each membrane spacer for laminar flow has a plurality of spaced apart linear contact regions with the two respective directly adjacent membranes in the internal space, wherein the respective linear contact regions with one of the directly adjacent membranes run in the same orientation as one another and do not intersect and the average distance between the respective linear contact regions with one of the directly adjacent membranes is no less than the spacing between the membranes that are separated from one another by the respective membrane spacer in the direction normal to their surfaces.

Likewise, the membrane spacers for laminar flow should have in the internal space as few contact regions with the directly adjacent membranes as possible which promote turbulence when a fluid flows through them along the linear contact regions. Consequently, a cell pack is preferred in which the membrane spacers for laminar flow each have in the internal space no further contact regions of any other type, e.g. punctiform contact regions, with one or both of the respective directly adjacent membranes, the average distance of which from one another is smaller than twice the distance of the directly adjacent membranes from one another, and preferably in each case no further contact regions of any other type with the respective directly adjacent membranes.

It is preferred in particular that the linear contact regions of the membrane spacers for laminar flow in a cell pack according to the invention are rectilinear and preferably have a length of at least 50%, particularly preferably of at least 80% of the extent of the internal space in the direction of the rectilinear contact region.

In a preferred embodiment of the cell pack, the membrane spacers for laminar flow do not follow one another directly along the direction of the stack, since when the cell pack according to the invention is used in a method according to the invention, segments through which the bath liquid flows are always separated from one another by segments through which the concentrate flows, so that there is no need to equip the cell pack in such a way that all of the membranes are spaced apart by spacers for laminar flow. It is even advantageous to configure those segments through which the concentrate flows by appropriate membrane spacers in such a way that turbulence of the concentrate is achieved in order on the one hand to guarantee rapid mass transfer with the strongest possible convection within the segment and on the other hand to minimize the extent of concentration gradients.

Accordingly, a cell pack according to the invention is particularly preferred which comprises a membrane stack consisting of an even number n of membranes, wherein at least every second membrane spacer of the cell pack in the direction of the stack, particularly preferably only every second membrane spacer of the cell pack in the direction of the stack, is a membrane spacer for laminar flow.

In a preferred cell pack, in which only every second membrane spacer of the cell pack in the direction of the stack is a membrane spacer for laminar flow, the following condition is additionally fulfilled for the spacing of the membranes by the spacers:

$$\frac{d_L^2 \cdot x(V_L)}{d_I^2 \cdot x(V_I)}$$

is greater than 3, preferably greater than 4, wherein $d_L$: is the spacing of the membranes by membrane spacers for laminar flow in the direction normal to the surfaces of the membranes (m), $d_I$: is the spacing of the membranes by membrane spacers that are not spacers for laminar flow and not external spacers, in the direction normal to the surfaces of the membranes (m), and $x(V_I; V_L)$: is the respective segment volume factor, which expresses the fraction of free fluid-permeable volume within the segment volume spanned by the membrane spacer and the directly adjacent membranes ($0 < x(V_I; V_L) \leq 1$). The segment volume corresponds to the volume that is delimited by the frame of a membrane spacer and the directly adjacent membranes. Thus, the respective segment volume is equal to the volume of the internal space of the corresponding membrane spacer. The segment volume factors $x(V_I; V_L)$ are identical with the segment volume factors $x(V_K; V_B)$ when using a cell pack according to the invention in a method according to the invention.

If this additional condition is fulfilled, rapid convection is promoted in the segment volume of the membrane spacers that are not spacers for laminar flow and not external spacers when a fluid flows through these. The rapid convection is in turn advantageous for an effective mixing of the concentrate in the segments that are not membrane spacers for laminar flow and not external spacers when such a cell pack is used in a method according to the invention together with the presence of laminar flow of the bath liquid in the remaining segments of the cell pack.

Likewise, it is preferred that the membrane spacers for laminar flow in the cell pack are arranged in relation to one another in such a way that a laminar flow occurs in the same orientation along the linear contact regions of all of the spacers with the respective directly adjacent membranes. In this way, a uniform direction of the partial volume streams through these membrane spacers can be achieved.

A cell pack according to the invention is extremely suitable in particular for use in a method of reducing the ionic strength in bath liquids having a dispersed solids content if each membrane spacer for laminar flow is delimited on the one side in the same way in the direction of the stack by a membrane which is selectively permeable to polyvalent ions, and is delimited on the other side in the same way in the direction of the stack by a membrane which is selectively permeable to monovalent ions.

The membrane spacers for laminar flow are configured in their internal space which is delimited by the frame preferably in such a way that they have a plurality of spacer elements arranged at a distance from one another, wherein at least one fixing element is provided, which joins a spacer element to a directly adjacent spacer element in each case to ensure that the spacer elements are in a fixed position in relation to one another and wherein each spacer element has a membrane contact region for linear contact either with one directly adjacent or spaced apart membrane or two opposing membrane contact regions for linear contact with both of the directly adjacent or spaced apart membranes, wherein all membrane contact regions of all spacer elements for linear contact with only one of the directly adjacent membranes run orthogonally to the direction of the stack and in the same orientation as one another.

The spacer elements in this case are preferably in the form of beam-like bars, which are joined together by one or more fixing elements transverse to the linear alignment of the bars.

The width of the linear membrane contact regions of the spacer elements of a membrane spacer for laminar flow is preferably no greater than $5 \cdot 10^{-3}$ m, particularly preferably no greater than $10^{-3}$ m, but is preferably at least $2 \cdot 10^{-4}$ m.

Furthermore, it is preferred that the fixing elements are joined with the spacer elements in such a way that the fixing elements of the membrane spacers have in the internal space no membrane contact regions for linear contact with at least one of the directly adjacent membranes which cross a contact region of one or more of the spacer elements, and that the fixing elements particularly preferably have no membrane contact region in the internal space for linear contact with at least one of the directly adjacent membranes, and in particular the fixing elements have no membrane contact region in the internal space for contact with at least one of the directly adjacent membranes.

Furthermore, those cell packs are preferred according to the invention in which the spacer elements of the membrane spacers for laminar flow divide the segment volume or the internal space of the spacers between two membranes that are directly adjacent or spaced apart by the membrane spacer into a plurality of smaller individual volumes that are separated spatially from one another orthogonally to the direction of the stack.

According to the invention, cell packs are preferred in which each membrane spacer for laminar flow has a segment volume factor $x(V_L)$ of at least 0.5, particularly of at least 0.75.

In principle, those cell packs are preferred in which the membrane areas available for mass transfer are as large as possible. On the other hand, the membrane spacers for spacing apart directly adjacent membranes must have contact regions with these. In another preferred configuration of the cell pack, the membrane spacers are therefore configured such that the contact areas of the membrane contact regions of all of the spacer elements with one of the directly adjacent membranes in the internal space of the spacer amount in total to no more than 50% of the respective membrane area enclosed by the frame of the spacer.

According to the invention, cell packs are preferred in which each membrane spacer that is not a membrane spacer for laminar flow and not an external membrane spacer has a segment volume factor $x(V_i)$ of less than 0.5, particularly preferably of less than 0.25. In a particularly preferred embodiment of the cell pack, all of the membrane spacers that are not membrane spacers for laminar flow and not external membrane spacers have a multiplicity of intersecting linear and/or punctiform contact regions with one of the directly adjacent membranes, wherein the reciprocal areal density of the intersections and punctiform contact regions on the respective directly adjacent membranes is less than 12 times, preferably less than 6 times the spacing between the directly adjacent membranes squared. This results in the strongest possible mixing of the fluid flowing through these spacers, wherein high shear stresses occur compared with the flow field in the internal space of the membrane spacers for laminar flow. These membrane spacers that are not membrane spacers for laminar flow and not outer membrane spacers of the cell pack are preferably selected from a nonwoven, woven or knitted fabric, wherein the thread width is preferably less than $10^{-3}$ m, particularly preferably less than $2 \cdot 10^{-4}$ m, and the nonwoven, woven or knitted fabric also serves to space apart directly adjacent membranes and nonwoven, woven or knitted fabrics thus exhibit contact regions with both of the directly adjacent membranes.

The frame of the membrane spacers serves to delimit the segment volume and thus undertakes a sealing function in the cell pack, in that it prevents the leakage of fluids flowing through the internal space of the spacers, owing to the delimitation of the part of the directly adjacent membranes that can be in contact with the fluid. Accordingly, the frame, which is of planar configuration, can additionally have a thin elastic coating, which further improves the sealing of the cell pack.

Internal space and frame of the membrane spacers in the cell pack according to the invention can be joined together rigidly, so that the frame already adequately or additionally stabilizes the spacer elements in the fluid-permeable internal space which are used for spacing and contacting the directly adjacent membranes. In this configuration of the spacers, the frame can accordingly assume the function of a fixing element, so that fixing elements can optionally be omitted in the internal space of the spacer.

Internal space and frame of the membrane spacers in the cell pack according to the invention can also, however, be designed in two parts, so that frame and structural elements of the internal space of the spacers represent individual components of the cell pack. Since the frame delimits the fluid-permeable internal space, the structural elements, such as spacing and fixing elements, which are used for spacing apart and contacting the directly adjacent membranes in the internal space of the spacer, are inserted into the recess provided by the frame in a two-part configuration of the membrane spacers.

The frames of the membrane spacers are configured and arranged according to the invention in such a way that a partial volume stream of a fluid A, e.g. the bath liquid, can flow through the respective internal space of the spacer and a fluid B, e.g. the concentrate, can flow through the frame in the direction of the stack. For this purpose, the frame preferably has on opposite sides on the one hand through-apertures, e.g. bores, and on the other hand distributor apertures, e.g. T-bores or simple bores with a recess to the respective internal space of the spacer. While a fluid can flow through the frame through the through-apertures without passing into the internal space of the spacer, the purpose of the distributor apertures is to allow a partial volume stream of a fluid to flow through the internal space of the spacer and to flow out of the internal space at the distributor aperture of the same spacer which is opposite in the frame and thus corresponds thereto. For the use of the cell pack according to the invention in the method according to the invention, for separating the bath liquid from the concentrate, a configuration of the cell pack is preferred in which the frames of the membrane spacers are arranged alternately in the direction of the stack in such a way that through-aperture, e.g. simple bore, meets distributor aperture, e.g. T-bore, and vice versa. The membranes of the cell pack then likewise possess through-apertures in the contact region with the frame of the spacers at the points at which the frame has a through-aperture or a distributor aperture.

The membrane spacers in the cell pack according to the invention are preferably made from a material that does not corrode when used in a method according to the invention in the aqueous concentrate, aqueous electrolyte and aqueous bath liquid, and therefore particularly preferably from plastic or an inert metal.

In a preferred embodiment of the cell pack, the surface normals of the membranes and membrane spacers always lie in the direction of the stack. This embodiment is simple to implement in the design of the cell pack and is therefore preferred.

In another embodiment, the membrane stack of the cell pack according to the invention is delimited on both sides in the direction of the stack by two electrically conductive current collectors, which rest on the two external membrane spacers.

In addition, it is preferred that the membrane stack of the cell pack according to the invention is configured and enclosed in a housing in such a way that fluids A and B can flow through the membrane stack orthogonally to the direction of the stack, wherein the fluid A flows exclusively through the segment volumes spanned by the membrane spacers for laminar flow and delimited by directly adjacent membranes, without any mixing occurring within the housing with the fluid B, which flows exclusively through the segment volumes spanned by every other membrane spacer and delimited by directly adjacent membranes.

The electrical current collectors are usually made from a metallic material and preferably have the same shape as the membranes and membrane spacers; the current collectors as well as the membranes and spacers are particularly preferably of rectangular and plate-like form. As metallic materials, inter alia corrosion-resistant alloys, such as nickel-molybdenum alloys (Hastelloy®) or platinum- or graphite-laminated metallic or metallically conductive support materials can be employed. In addition to the required corrosion resistance and abrasion resistance of the electrode material, an economically viable process requires the electrode materials for the corresponding electrochemical partial reaction for decomposing the electrolyte to exhibit the lowest possible overvoltage and so the current collectors are often coated with precious metals of the elements platinum, ruthenium and/or iridium.

The invention is described by way of example below using individual exemplary embodiments with accompanying Figures.

FIG. 1 shows a schematic layout of a preferred cell pack 100 according to the invention in an exploded perspective view. The cell pack 100 comprises a series of membranes 107, which are separated from one another by membrane spacers 200, 300, wherein the respective membrane spacers 200, 300 form segments 108a, 108b, 108c with membranes 400a, 400b, which are directly adjacent, or with adjacent current collectors 500, 500'. Every second membrane spacer 200, 300 of the cell pack 100 in the direction of the stack is a membrane spacer for laminar flow 200. The cell pack 100 is delimited on both sides in the direction of the stack by current collectors 500, which consist of stainless steel with the Werkstoffnummer (Material Number) 1.4401 according to European Standard (see FIG. 5). All of the membranes 400a, 400b of the cell pack 100 possess simple bores 109 in the marginal region as through-apertures, which allow the concentrate and the bath liquid to flow through in the direction of the stack. Correspondingly, all of the membrane spacers 200, 300 along the stack have, coinciding with the simple bores 109 of the membranes 400a, 400b and along the opposing marginal regions of the membrane spacers 200, 300, alternately distributor elements 110, which additionally allow flow through the individual segments 108a, 108b, 108c, and simple bores 109 as through-apertures, wherein, in the direction of the stack, the distributor elements 110 of a membrane spacer 300, 200 meet a simple bore 109 of the directly adjacent membrane spacers 200, 300 and vice versa. In both of the current collectors 500 there are likewise simple bores 109 for the inlet 101, 102 and the outlet 103, 104 of the two volume streams $V_K$ of the concentrate and $V_B$ of the bath liquid. In a cell pack 100 of this type according to the invention, the volume streams $V_K$ and $V_B$ can accordingly be fed in at the respective inlets 101, 102 on the current collector, and then break down in the respective segments 108 of the cell pack 100 into the respective partial volume streams $\delta_i(V_K)$ 105 and $\delta_i(V_B)$ 106, which in turn run within the membrane spacers 200, 300 orthogonally to the direction of the stack between adjacent marginal regions of the membrane spacers 200, 300 provided with distributor elements 110 along the membranes 400 and can then be removed at the outlets 103, 104 combined as volume stream $V_K$ and $V_B$, without any mixing of the two volume streams $V_K$ and $V_B$ occurring in the cell pack 100. All of the partial volume streams $\delta_i(V_K)$ 105 in this preferred embodiment according to the invention flow exclusively through the membrane spacers 300 of the segments 108b, 108c, while all of the partial volume streams $\delta_i(V_B)$ 106 flow exclusively through the membrane spacers for laminar flow 200 of the segments 108a of the cell pack 100.

Figure 2:
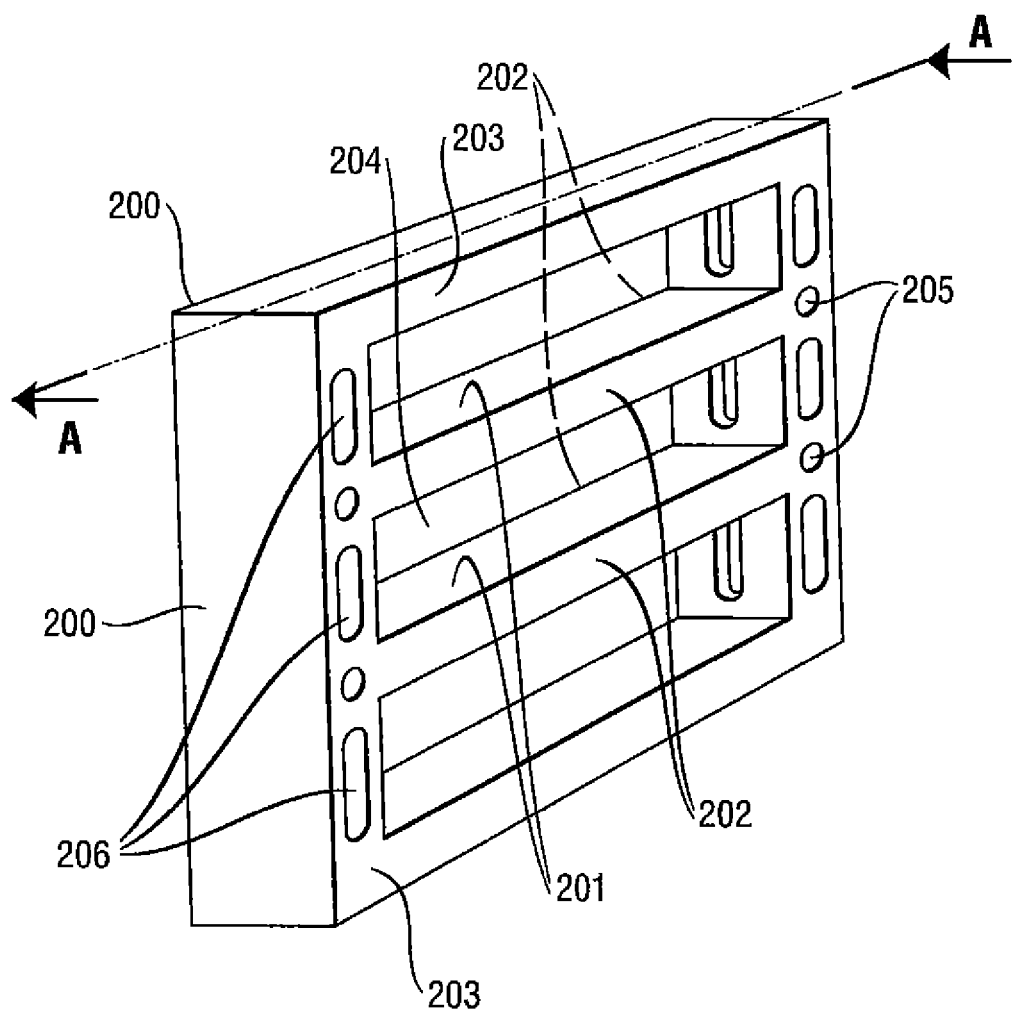
FIG. 2 shows a schematic perspective projection of a membrane spacer for laminar flow of a preferred cell pack according to the invention according to FIG. 1.

FIG. 2 shows a schematic perspective projection of a membrane spacer for laminar flow 200 of a preferred cell pack 100 according to the invention as in FIG. 1. The membrane spacer for laminar flow 200 has a frame 203 and further spacer elements running in the internal space 204, which take the form of bars 201 each having a rectilinear membrane contact region 202. The frame 203 in this version of the membrane spacer 200 is used both to delimit the fluid-permeable internal space 204 and as a fixing element, which joins together the spacer elements that take the form of bars 201. On opposite sides of the frame 203 of the membrane spacer for laminar flow 200, simple bores 205 as through-apertures and T-bores 206 as distributor elements are alternately sunk, wherein the T-bores 206 are sunk in such a way that a partial volume stream of a fluid can flow through these T-bores 206 into the internal space 204 of the membrane spacer 200 delimited by the frame 203 and along the bars 201 through the internal space 204, to flow out of the internal space 204 on the opposite side of the frame 203 in each case through corresponding T-bores 206.

Figure 2A:
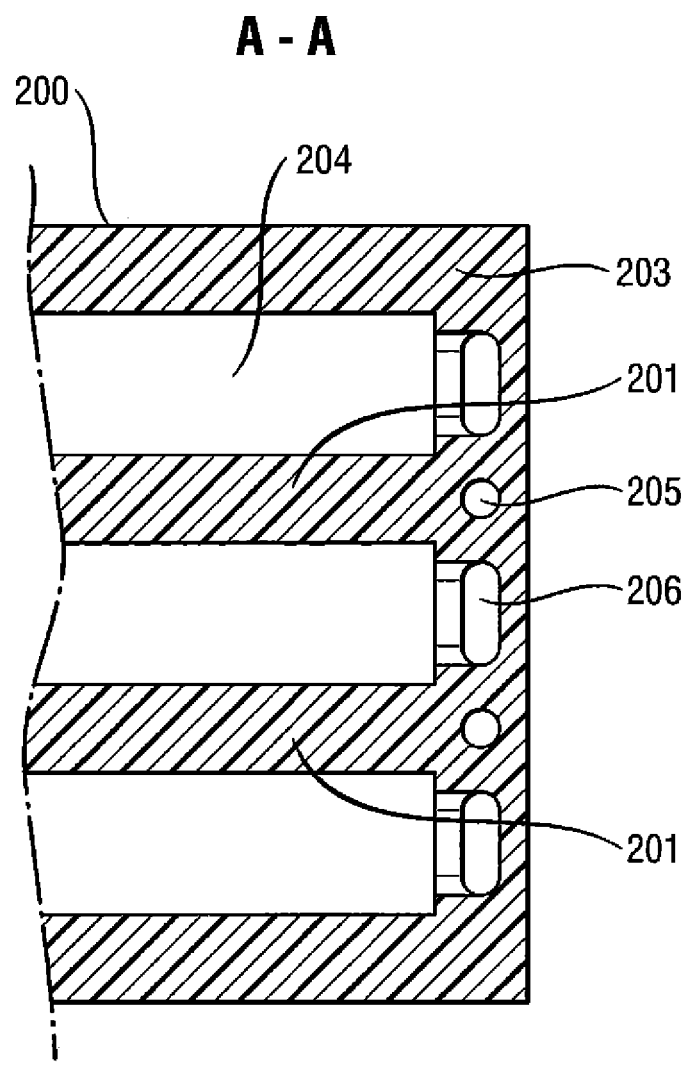
FIG. 2a shows a schematic cross-sectional view of the membrane spacer from FIG. 2 along the plane A-A.

FIG. 2a shows a schematic cross-sectional view of the membrane spacer 200 from FIG. 2 along the plane A-A with the simple bores 205 and T-bores 206 located in the frame, which are sunk into the frame 203 of the membrane spacer 200, which delimits the fluid-permeable internal space 204.

Figure 3:
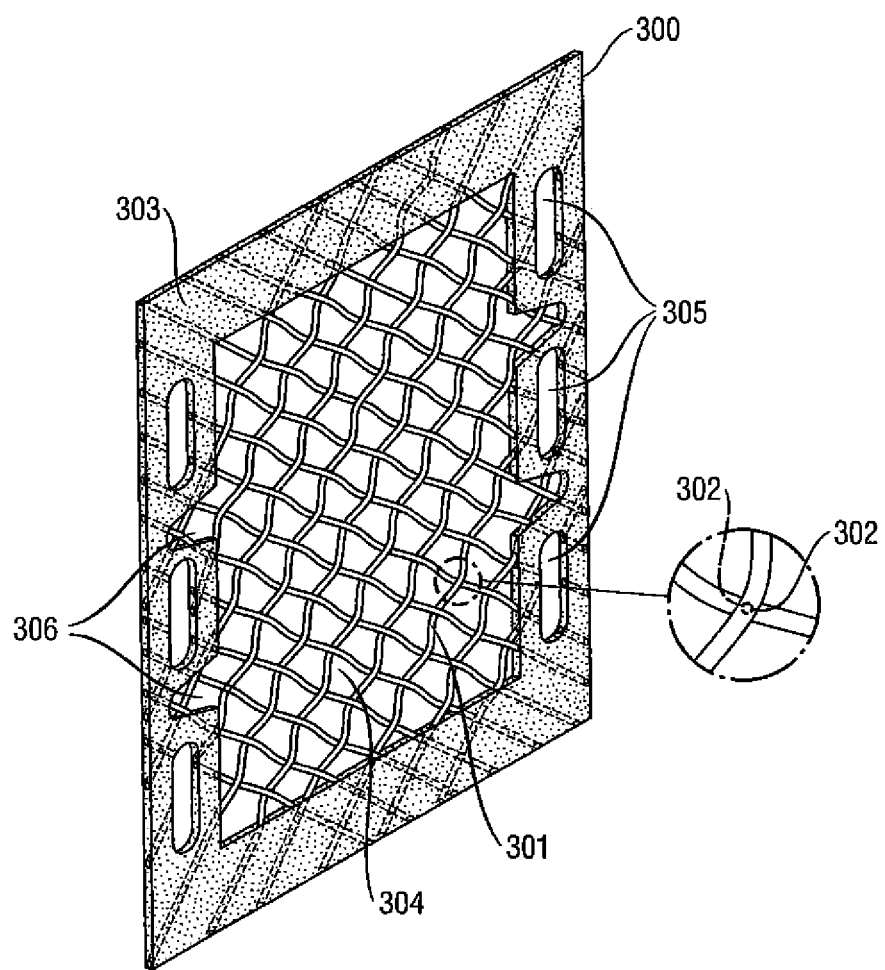
FIG. 3 shows a schematic perspective projection of a membrane spacer, which is not a spacer for laminar flow, of the cell pack according to the invention according to FIG. 1.

FIG. 3 shows a schematic perspective projection of a membrane spacer 300 of the preferred cell pack according to the invention as in FIG. 1, which is not a spacer for laminar flow. The membrane spacer 300 has a frame 303 and spacer elements running in the internal space 304, which take the form of a woven fabric 301 with plain weave, so that punctiform membrane contact regions 302 result. The frame 303 here is implemented as a material composite of the woven fabric 301 and a rubber-elastic material, so that the free spaces in the marginal region of the woven fabric 301 are packed with the rubber-elastic material and the thickness of the frame 303 corresponds approximately to the thickness of the woven fabric. On opposite sides of the frame 303 of the membrane spacer 300, simple bores 305 as through-apertures and simple bores with a recess 306 as distributor elements are alternately sunk, wherein the recesses of the simple bores 306 of the distributor elements are sunk in such a way that a partial volume stream of a fluid can flow through these bores 306 into the internal space 304 of the membrane spacer 300 delimited by the frame 303 and through the internal space 304, to flow out from the internal space 304 on the respective opposite side of the frame 303 through corresponding simple bores with recess 306.

Figure 4:
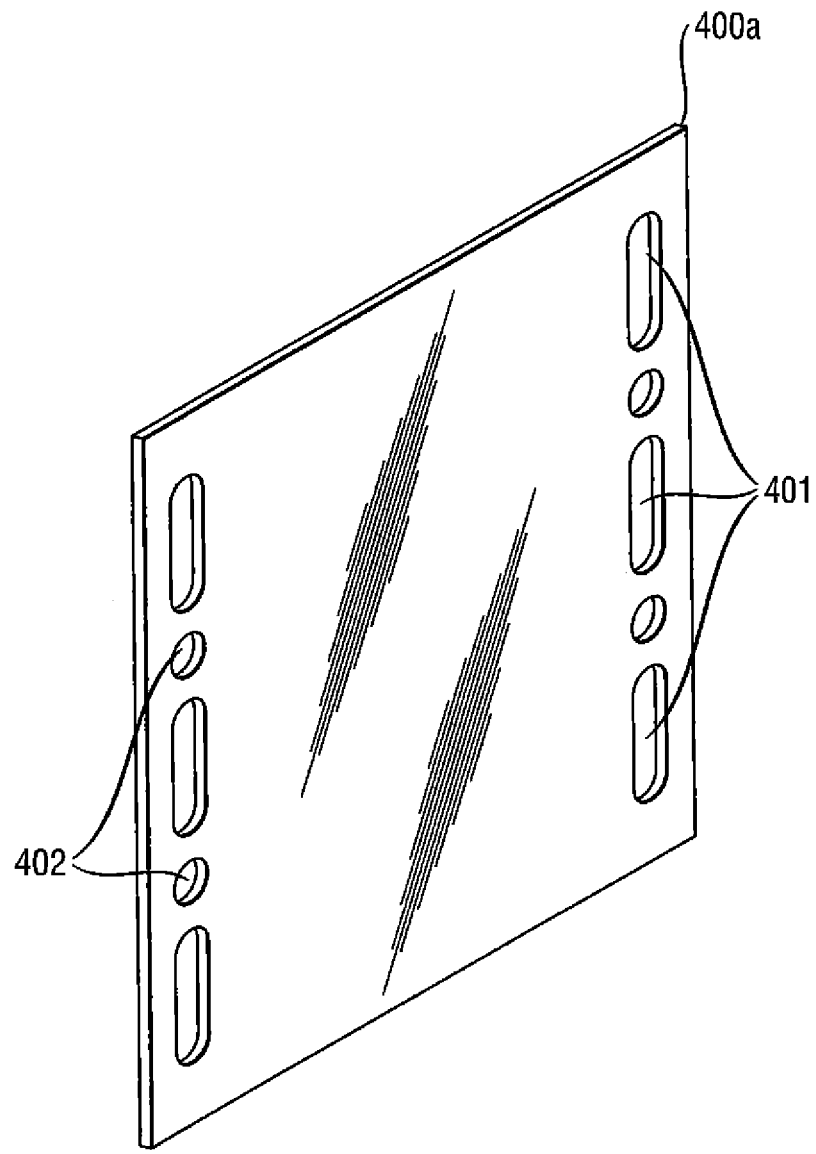
FIG. 4 shows a schematic perspective projection of a membrane of the cell pack according to FIG. 1.

FIG. 4 shows a schematic perspective projection of a membrane 400a of the preferred cell pack 100 according to FIG. 1. The membrane 400a has through-apertures in the marginal region on opposite sides, wherein on each side through-apertures 406 to the segments 110 with membrane spacers for laminar flow 200 alternate with through-apertures 405 to the segments 110 with membrane spacers 300 which are not spacers for laminar flow. The through-apertures 405 and 406 are configured as simple bores here. A corresponding schematic perspective projection of a membrane 400b is identical with FIG. 4.

Figure 5:
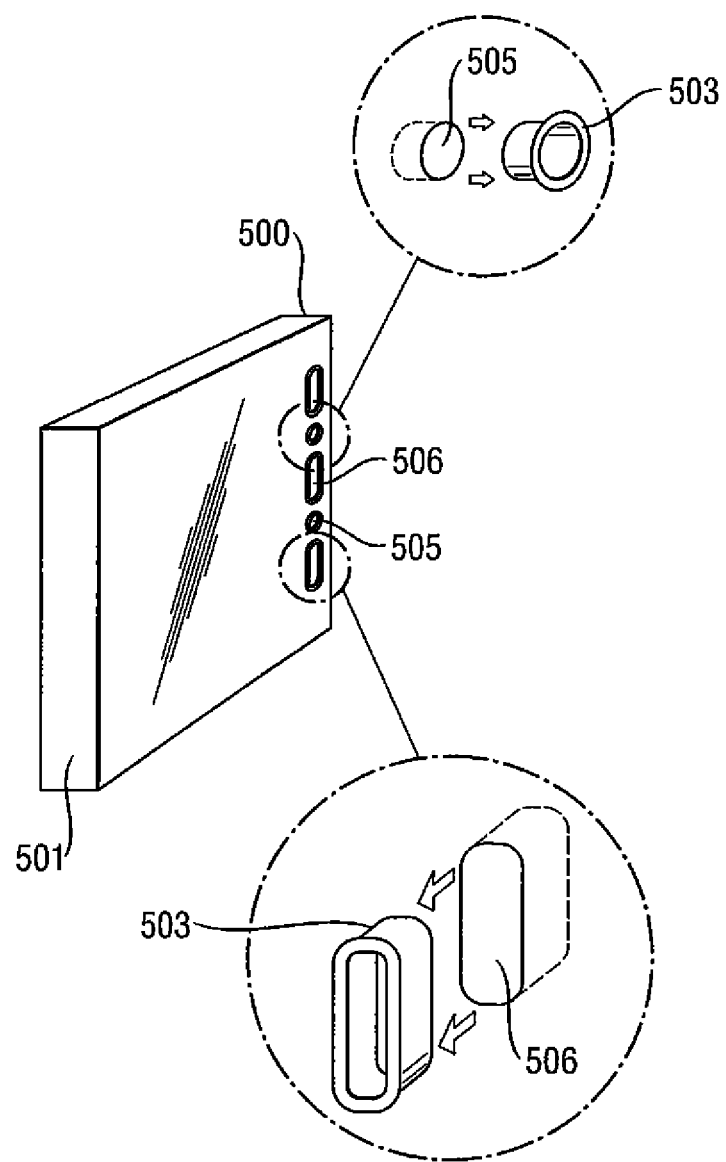
FIG. 5 shows a schematic perspective projection of the current collectors delimiting the cell pack according to FIG. 1.

FIG. 5 shows a schematic perspective projection of one of the current collectors 500 delimiting the cell pack 100 according to FIG. 1, which have in the marginal region simple bores 505, 506 for the inlet or outlet of the volume streams $V_K$ 105 of the concentrate and $V_B$ 106 of the bath liquid. Electrically insulating sleeves 503 are sunk into the simple bores 505, 506. The current collectors 500 consist of stainless steel with the Werkstoffnummer (Material Number) 1.4401 according to European Standard. Both of the current collectors 500 delimiting the cell pack 100 are identical in construction and differ in the operation of the method according to the invention only through the fact that the simple bores 505, 506 of the one current collector 500 represent the inlet points of the volume streams $V_K$ 105 of the concentrate and $V_B$ 106 of the bath liquid in the cell pack 100, while the simple bores 505, 506 of the opposite second current collector 500 are the corresponding outlet points for the volume streams $V_K$ 105 of the concentrate and $V_B$ 106 of the bath liquid.

List of reference signs:

| | |
|---|---|
| 100 | Cell pack |
| 101 | Inlet for concentrate volume stream |
| 102 | Inlet for bath liquid volume stream |
| 103 | Outlet for concentrate volume stream |
| 104 | Outlet for bath liquid volume stream |
| 105 | Partial volume stream $\delta_i(V_K)$ |
| 106 | Partial volume stream $\delta_i(V_B)$ |
| 107 | Series of membranes |
| 108a | Segment for partial volume stream $\delta_i(V_B)$ |
| 108b | Segment for partial volume stream $\delta_i(V_K)$ |
| 108c | Segment delimited by current collector 500 and membrane 400a |
| 109 | Simple bore |
| 110 | Distributor element |
| 200 | Membrane spacer for laminar flow |
| 201 | Bar |
| 202 | Membrane contact region |
| 203 | Frame |
| 204 | Internal space |
| 205 | Simple bore for concentrate |
| 206 | T-bore for bath liquid |
| 300 | Membrane spacer |
| 301 | Woven fabric |
| 302 | Membrane contact region |
| 303 | Frame made of rubber-elastic material and woven fabric |
| 304 | Internal space |
| 305 | Simple bore for bath liquid |
| 306 | Simple bore with recess for concentrate |
| 400a | Outer membrane |
| 400b | Inner membrane |
| 401 | Through-aperture to segment volume with membrane spacer 200 |
| 402 | Through-aperture to segment volume with membrane spacer 300 |
| 500 | Current collector |
| 501 | Support plates |
| 503 | Insulating sleeves |
| 505 | Simple bore for concentrate |
| 506 | Simple bore for bath liquid |

The invention claimed is:
1. A cell pack for electrodialysis comprising:
a membrane stack consisting of a number n of membranes and n+1 membrane spacers of planar configuration each comprising a frame delimiting an internal space permeable to fluid in a direction orthogonal to a direction of the stack,
wherein the n+1 membrane spacers and the n membranes are arranged alternately in the direction of the stack,
wherein all of the membranes represent cation exchangers or all of the membranes represent anion exchangers, and
wherein the membrane spacers comprise membrane spacers for laminar flow configured to have fluid-permeable internal space comprising a plurality of linear contact regions with each of the respective directly adjacent membranes, wherein the membrane spacers for laminar flow are not external spacers of the stack, wherein the linear contact regions are spaced apart from one another, wherein the linear contact regions formed with at least one of the directly adjacent membranes run in a same orientation as one another and do not cross one another, and an average distance of the linear contact regions from one another is no smaller than the spacing of the membranes that are separated from one another by the membrane spacers in a direction of their surface normals.

2. The cell pack according to claim 1, wherein the number n is an even number and wherein a second membrane spacer in the direction of the stack is a membrane spacer for laminar flow.

3. The cell pack according to claim 1, wherein the membrane spacers for laminar flow each have in the internal space no additional contact regions with one or both of the respective directly adjacent membranes.

4. The cell pack according to claim 1, wherein the contact regions of the membrane spacers for laminar flow in the internal space are linear and have a length of at least 50% of an extent of the internal space in the direction of the linear contact region.

5. The cell pack according to claim 1, wherein the membrane spacers for laminar flow space the directly adjacent membranes apart by at least $10^{-3}$ m in the direction of the stack.

6. The cell pack according to claim 1, wherein the membrane spacers for laminar flow comprise in the internal space a plurality of spacer elements arranged at a distance from one another and at least one fixing element joining a spacer element to a directly adjacent spacer element to ensure that the spacer elements are in a fixed position in relation to one another, and
wherein each spacer element has a membrane contact region for linear contact either with one directly adjacent membrane or two opposing membrane contact regions for linear contact with both of the directly adjacent membranes,
wherein all membrane contact regions of all spacer elements for linear contact with only one of the directly adjacent membranes run orthogonally to the direction of the stack and in a same orientation as one another.

7. The cell pack according to claim 6, wherein the at least one fixing element is joined to the spacer elements such that the at least one fixing element has in the internal space of the membrane spacer no membrane contact regions for linear contact with at least one of the directly adjacent membranes that cross a contact region with one or more of the spacer elements and that the at least one fixing element has no membrane contact region in the internal space of the membrane spacer for linear contact with at least one of the directly adjacent membranes.

8. The cell pack according to claim 1, wherein each membrane spacer for laminar flow includes a membrane which is selectively permeable to polyvalent ions on one side in the direction of the stack and a membrane which is selectively permeable to monovalent ions on another side in the direction of the stack.

9. The cell pack according to claim 1, wherein each membrane spacer that is not a membrane spacer for laminar flow is configured in the internal space as a nonwoven, woven or knitted fabric.

10. A method of reducing a concentration of unwanted polyvalent ions in an aqueous bath containing a dispersed organic binder and polyvalent ions, comprising:
feeding a volume stream $V_B$ of a bath liquid from an aqueous bath containing the bath liquid and a volume stream $V_K$ of an aqueous concentrate from a concentrate reservoir into a cell pack for electrodialysis comprising a membrane stack of a plurality of membranes spaced apart from one another which, in the event that unwanted polyvalent cations are contained in the bath liquid, comprises exclusively cation exchangers, or in the event that unwanted polyvalent anions are contained in the bath liquid, comprises exclusively anion exchangers, and electrically conductive current collectors which delimit the membrane stack on both sides in the direction of the stack,
wherein the volume streams $V_B$ and $V_K$ break down within the cell pack into partial volume streams $\delta_i(V_B)$ and $\delta_i(V_K)$, which flow separated spatially from one another, orthogonal to the surface normal of a series of membranes of the membrane stack through the segments formed by directly adjacent and spaced apart membranes of the series of membranes, wherein segments of the series of membranes, through which only a partial volume stream $\delta_i(V_B)$ of the bath liquid flows, alternate in the direction of the stack with those segments of the series of membranes through which only a partial volume stream $\delta_i(V_K)$ of the concentrate flows, wherein the bath liquid flows over adjacent membranes in a laminar fashion within the segments of the series of membranes,
wherein each of the outer membranes of the membrane stack on the side facing the directly adjacent current collector is either in contact with an aqueous electrolyte which is spatially separated from the aqueous concentrate and the bath liquid by the segment formed by the respective current collector and the respective outer membrane, or is supplied with a flow of a partial volume stream $\delta_i(V_K)$ of the aqueous concentrate,
applying, at intervals or permanently, an electrical voltage to the electrically conductive current collectors which are in contact with the aqueous electrolyte and/or the aqueous concentrate, wherein the applied electrical voltage is sufficient to cause electrolytic decomposition of the aqueous electrolyte and/or of the concentrate,
combining and feeding the partial volume streams $\delta_i(V_B)$ of the bath liquid, after passage through the membrane stack, into the aqueous bath; and
combining and at least partially transferring the partial volume streams $\delta_i(V_K)$ of the aqueous concentrate, after passing through the membrane stack, into the concentrate reservoir.

11. The method according to claim 10, wherein a ratio of average flow rate of the bath liquid in meters per second within the segments of the cell pack through which the bath liquid with the partial volume streams $\delta_i(V_B)$ flows to the spacing between the membranes in the direction normal to their surfaces within the segments in meters is less than 100, where an average flow rate of the bath liquid is no greater than 0.1 m/s.

12. The method according to claim 10, wherein the following condition is fulfilled within the segments of the cell pack formed by the series of the membranes:

$$\frac{d_B^2 \cdot x(V_B) \cdot \delta_i(V_K)}{d_K^2 \cdot x(V_K) \cdot \delta_i(V_B)} > 3$$

where
$\delta_i(V_B)$ denotes the partial volume stream of the bath liquid within the segment in m³/s;
$\delta_i(V_K)$ denotes the partial volume stream of the concentrate within the segment in m³/s;
$d_B$, $d_K$ denote the spacing between the membranes in the respective segment in the direction normal to their surfaces in meters; and
$x(V_K; V_B)$ denotes the segment volume factor which expresses the proportion of free volume within the segment through which flow is passing in each case, and $0 < x(V_K; V_B) \leq 1$.

13. The method according to claim 10, wherein an electrical voltage is applied by potentiostatic pulses, pulse duration being in a range of 0.5 to 50 seconds, and pulse rest phase being in a range of 0.2 to 10 seconds.

14. The method according to claim 10, further comprising feeding a volume flow $V_E$ of the aqueous electrolyte from an electrolyte reservoir storing the aqueous electrolyte into the cell pack such that the volume flow $V_E$ breaks down within the cell pack into partial volume streams $\delta_i(V_E)$ that flow orthogonal to the surface normal of the outer membranes of the membrane stack through the segments of the cell pack formed by the current collectors and the directly adjacent outer membranes and are combined and at least partially transferred into the electrolyte reservoir after passing through the segments within the cell pack.

15. The method according to claim 10, wherein exclusively the volume streams $V_B$ and $V_K$ are fed into the cell pack, wherein in each case a partial volume stream $\delta_i(V_K)$ of the aqueous concentrate flows through the segments of the cell pack formed by the current collectors and the directly adjacent outer membranes and is combined with the other partial volume streams $\delta_i(V_K)$ of the aqueous concentrates that flow through the segments of the series of membranes after passing through the segments within the cell pack.

16. The method according to claim 15, wherein the concentration of an unwanted polyvalent ionic species in the concentrate is kept below a critical concentration by continuously or discontinuously replacing partial volumes of the aqueous concentrate with an aqueous solution having an electrical conductivity of at least 1 mScm$^{-1}$ containing no polyvalent ions, wherein for the critical concentration of an unwanted polyvalent ionic species the following relationship applies:

$$c_s^{krit}(K) = c_s(B) \cdot \frac{\sum_{i \neq s} z_i u_i c_i(K)}{\sum_{j \neq s} z_j u_j c_j(B)}$$

where,
$c_s^{krit}(K)$ is critical concentration of the unwanted polyvalent ionic species in the concentrate in mol/l;
$c_s(B)$: is concentration of the unwanted polyvalent ionic species in the bath liquid in mol/l;
$z_i$, $z_j$: denotes charge number of ionic species i, j, respectively;
$u_i$, $u_j$: denotes ion mobility of ionic species i, j, respectively in m$^2$s$^{-1}$V$^{-1}$;
$c_i$, $c_j$: denotes concentration of ionic species i, j, respectively in mol/l;
$z_i u_i c_i(K)$: is a product of charge number, ion mobility and concentration of an ionic species i with the same charge as the unwanted ionic species in the concentrate; and
$z_j u_j c_j(B)$: is a product of charge number, ion mobility and concentration of an ionic species j with the same charge as the unwanted ionic species in the bath liquid.

17. The method according to claim 10, wherein the cell pack comprises a membrane stack wherein n+1 membrane spacers and n membranes are arranged alternately in the direction of the stack, wherein the membrane spacers comprise membrane spacers for laminar flow configured to have fluid-permeable internal space comprising a plurality of linear contact regions with each of the respective directly adjacent membranes, wherein the membrane spacers for laminar flow are not external spacers of the stack, wherein the contact regions are spaced apart from one another, wherein the linear contact regions formed with at least one of the directly adjacent membranes run in the same orientation as one another and do not cross one another and the average distance of these linear contact regions from one another is no smaller than the spacing of the membranes that are separated from one another by these membrane spacers in the direction of their surface normals and the partial volume streams $\delta_i(V_B)$ of the bath liquid flow exclusively through the segments of the series of membranes having the directly adjacent membranes spaced apart by membrane spacers for laminar flow.

18. The method according to claim 10, wherein the bath liquid contains an anionically dispersed binder and unwanted polyvalent cations, the unwanted polyvalent cations being selected from zinc ions, iron ions and aluminum ions.

19. The method according to claim 18, wherein free fluoride ions are additionally contained in the bath liquid.

20. The method according to claim 18, wherein the membranes of the series of membranes being supplied with flow of the aqueous concentrate or being in contact with the aqueous electrolyte on a side facing the cathode are selectively permeable to unwanted polyvalent cations while the membranes of the series of membranes being supplied with flow of the aqueous concentrate or being in contact with the aqueous electrolyte on a side facing the anode are selectively permeable to monovalent cations.

* * * * *

UNITED STATES PATENT AND TRADEMARK OFFICE
CERTIFICATE OF CORRECTION

| | |
|---|---|
| PATENT NO. | : 9,511,325 B2 |
| APPLICATION NO. | : 14/284530 |
| DATED | : December 6, 2016 |
| INVENTOR(S) | : Klaus Lepa and Ulrich Dawidowski |

It is certified that error appears in the above-identified patent and that said Letters Patent is hereby corrected as shown below:

Column 6, Line 4: Change "$\beta i\ (V_K)\ (105)$" to -- $\delta i\ (V_K)\ (105)$ --.

Column 6, Line 10: Change "$\beta i\ (V_B)\ (106)$" to -- $\delta i\ (V_B)\ (106)$ --.

Column 6, Line 27: Change "$\beta i\ (V_B)$" to -- $\delta i\ (V_B)$ --.

Column 6, Line 29: Change "$\beta i\ (V_K)$" to -- $\delta i\ (V_K)$ --.

Column 6, Line 49: Change "$\beta i\ (V_E)$" to -- $\delta i\ (V_E)$ --.

Column 6, Line 60: Change "$\beta i\ (V_K)\ (105)$" to -- $\delta i\ (V_K)\ (105)$ --.

Column 6, Line 64: Change "$\beta i\ (V_K)\ (105)$" to -- $\delta i\ (V_K)\ (105)$ --.

Column 8, Line 58: Change "$\beta i\ (V_B)$" to -- $\delta i\ (V_B)$ --.

Column 10, Line 19: Change "$\beta i\ (V_B)$" to -- $\delta i\ (V_B)$ --.

Column 10, Line 36: Change "another," to -- another. --.

Column 10, Line 56: Change "$\beta i\ (V_B)$" to -- $\delta i\ (V_B)$ --.

Column 12, Line 61: Change "$\beta i\ (V_B)$" to -- $\delta i\ (V_B)$ --.

Column 12, Line 62: Change "$\beta i\ (V_K)$" to -- $\delta i\ (V_K)$ --.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*